US006910413B2

(12) United States Patent
Tweedy et al.

(10) Patent No.: US 6,910,413 B2
(45) Date of Patent: Jun. 28, 2005

(54) WORKPIECE REGISTRATION STATION FOR A DECORATING MACHINE

(75) Inventors: Mark R. Tweedy, Valencia, PA (US); Carl J. Strutz, Mars, PA (US); John M. Zwigart, New Brighton, PA (US); Gary W. McCoy, Butler, PA (US)

(73) Assignee: Carl Strutz & Co., Inc., Mars, PA (US)

( * ) Notice: Subject to any disclaimer, the term of this patent is extended or adjusted under 35 U.S.C. 154(b) by 0 days.

(21) Appl. No.: 10/811,445

(22) Filed: Mar. 26, 2004

(65) Prior Publication Data

US 2004/0177775 A1 Sep. 16, 2004

Related U.S. Application Data

(62) Division of application No. 10/305,475, filed on Nov. 27, 2002, now Pat. No. 6,823,781.

(51) Int. Cl.$^7$ .......................... B41F 17/08; B65G 33/02

(52) U.S. Cl. .................... 101/40; 198/343.1; 198/467.1

(58) Field of Search .......................... 101/38.1, 39, 40, 101/40.1, 44, 126, 485, DIG. 36; 198/343.1, 467.1

(56) References Cited

U.S. PATENT DOCUMENTS 3,362,520 A * 1/1968 Rudolph et al. ............ 198/378
4,080,896 A * 3/1978 McKay et al. .............. 101/486
5,524,535 A * 6/1996 Strutz et al. ............... 101/38.1
6,073,553 A * 6/2000 Tweedy et al. ............... 101/40
6,082,256 A * 7/2000 Hellmeier et al. ............ 101/35

* cited by examiner

*Primary Examiner*—Stephen R. Funk
(74) *Attorney, Agent, or Firm*—Clifford A. Poff

(57) ABSTRACT

A reduction to the traveling motion of bottles along a delivery conveyor in an intermittent motion decorating machine is provided by one of a pair of workpiece feed cams rotatably supported in a side-by-side relation to rotate about spaced horizontal axes lying in a common horizontal plane. The workpiece feed cams have feed cam tracks for receiving cam followers of each of plurality of vertical bottle carriers. One of the feed cam tracks reduces the speed of the bottle carriers from a relatively high entry speed corresponding to the through put speed in the decorating machine to the speed of the deliver conveyor for more densely populating the delivery conveyor with workpieces. Carrier transfer members at each of opposite ends of the workpiece feed cams transfer the bottle carriers from one to the other of the workpiece feed cams. A drive rotates the workpiece feed cams, carrier return cams and carrier transfer members. The decorating machine is provided with a registration station preceding spaced apart decorating stations. The registration station includes a drive to reduce the clamping pressure by chucks on a workpiece while establishing a predetermined orientation of each workpiece relative to the decorating stations.

10 Claims, 35 Drawing Sheets

WORKPIECE REGISTRATION STATION FOR A DECORATING MACHINE

CROSS-REFERENCE TO RELATED APPLICATIONS

This application is a divisional application of Ser. No. 10/305,475, filed Nov. 27, 2002, now U.S. Pat. No. 6,823,781.

BACKGROUND OF THE INVENTION

1. Field of the Invention

The present invention relates to an ancillary conveyance to adjust the transport speed of a workpiece while supported on a conveyor driven at a constant speed for the supply and/or discharge of workpieces to a decorating machine conveyor of an intermittent motion type-decorating machine, preferably incorporating an improved workpiece registration station.

2. Description of the Prior Art

U.S. Pat. Nos. 2,231,535; 2,261,255; 2,721,516; 3,146,705; 3,388,574; and 5,524,535 disclose intermittent motion type decorating machines using an indexing drive system to impart intermittent traveling motion to an endless chain conveyor provided with workpiece carriers for supporting workpieces such as bottles made of glass or plastic. U.S. Pat. No. 3,388,574 discloses horizontally orientated bottle carriers arranged in a side-by-side relation on a conveyor chain and used for supporting each bottle in a horizontal orientation while intermittently moved along a path of travel through a decorating machine. Each bottle is supported at its opposite ends by clamping chucks. One chuck, rotated by a machine drive, is temporarily connected with a crank arm on a journal extending from a bearing support. The other clamping chuck is resiliently moveable by a spring to release and resiliently the bottle for rotation about a horizontal axis extending along the extended length of the bottle. The clamping chucks are supported on a base, which is secured to chain-links forming the endless conveyor chain extending along the path of travel of bottles through the decorating machine. The clamping force acting on the bottle by the clamping chucks is the only force retaining the bottle on the conveyor. The effect of inertia acting on the bottle in response to the intermittent motion at a given through put speed must be offset by the clamping force. However, the magnitude of the clamping force establishes a break away force for relative rotation between the bottle and the clamping chucks for registration of the bottle relative to the decoration cycle by the machine.

In these known forms of intermittent motion decorating machines, a bottle is moved by the endless chain conveyor driven by an indexing drive through a predetermined distance, stopped, moved again through a predetermined distance, stopped and again moved until each bottle is advanced by the sequence of motions completely through all of the decorating stations of the decorating machine. A decorating station is provided at one or more places along the conveyor where the bottle comes to a stop. Additionally, a registration drive is arranged along the conveyor between the bottle loading station and the first decorating station. The registration drive rotates the bottle and uses an indexing finger to engage in a recess in the wall of the bottle. This action causes a slip clutch action by the stoppage to the rotation of the bottle while the driven clamping chuck continues to rotate to a completion of the registration cycle. The stoppage to the rotation of the bottle establishes a predetermined orientation of the bottle surface relative to a decorating station and serves for orientating the bottle particularly the usual seam line in the bottle surface formed by the parting line of the parsons mold part relative to the printing screen at each decorating station. One half of the decorating cycle is used for decorating the bottles and the remaining half of the cycle is used for the indexing movement of the bottle through the decorating machine. At each decorating station while the bottle is stopped from traveling motion, a decorating screen is displaced into line contact by an associated squeegee with the surface of the bottle while the bottle is rotated about the longitudinal axis thereof. During the first part of the decorating cycle, the screen is moved synchronous with the peripheral speed of the rotating bottle to avoid smearing during decoration at the line of contact established between a squeegee and the bottle. The squeegee remains stationary during the decorating process. When the screen moves to the end of its travel, the bottle has rotated 360° whereupon the screen drive mechanism maintains the screen stationary for the remaining part of the decorating cycle while the bottle is removed from the decorating station and an undecorated bottle is moved to the decorating station.

Thermosetting ink was usually the printing medium in such intermittent motion decorating machines, particularly when multiple color decoration was applied to the bottles. Ink of only one color is applied at each decorating station and to decorate with multiple colors requires a corresponding number of decoration stations. When the different colors interleave in a given area of the bottle and therefore, because the same area is contacted with a screen for applying each color, it is necessary that the applied ink/color is solid and will not smear before each additional ink/color is applied. Although the thermosetting ink is solidified after each printing operation, it is necessary to cure the ink usually by feeding the bottles through a furnace after discharging from the decorating machine. In U.S. Pat. No. 6,079,326, curing of an ink decoration is completed after applied at one decorating station before an additional decoration is applied. The dwell period to the intermittent advancing motion by the conveyor chain is used to both apply ink decoration and to cure the applied decoration all at spaced apart sites along the course of travel by the bottles in the decorating machine. All the decoration on a bottle when delivered from the decoration machine is cured so that the bottles can be loaded directly into a shipping container without the need to cure the decoration in a furnace.

As disclosed in U.S. Pat. No. 5,524,535 the machine cycle in an intermittent motion decorating machine is altered to attain an increase to the workpiece decoration rate. The altered machine cycle provides that the portion of the cycle for conveyor indexing have a reduced duration in order to provide an increased part of the machine cycle for decorating. The conventional chain conveyor required an indexer drive to transmit the torque required to rapidly accelerate and decelerate a chain conveyor laden with carriers and including the compliment of bottles or workpieces processed in a decorating machine. A deviation to the use of a chain conveyor for workpieces in an intermittent decorating machine is disclosed in U.S. Pat. No. 6,073,553 and notably includes the use of elongated barrel cams and transfer disks arranged to provide a continuous traveling motion to the horizontal workpiece carriers. The traveling motion of the horizontal carriers is interrupted only at each decorating station and, when provided, at each curing station. The continuous traveling motion greatly increased the through put rate for workpieces in the decorating machine.

The present invention provides an increase to the rate at which the workpieces are delivered and, if desired, supplied to an intermittent motion decorating machine. The handling of workpieces particularly bottles demand the use of constraints as they are manipulated during the feeding operation from a source of supply and discharged from the decorating conveyor. The glass forming operations employed to produce the bottle also impose dimensional variations to the bottles that must be accommodated particularly during high speed handling by the bottle at the entry and delivery equipment as well as during passage through the actual bottle decorating machine.

The present invention further seeks to provide a workpiece steadying apparatus to alter the transfer speed of workpieces individually and consecutively from a delivery rate by a decorating transfer conveyor as received from the transfer operation carried out simultaneously with a reorientation of the workpiece. The change to the workpiece orientation, such when the workpiece comprises a bottle, has been carried out in the past as shown in U.S. Pat. No. 3,648,821 in which a conveyor supplies the bottles in a vertical orientation to a point where they are orientated horizontally and transferred to a conveyor of a decorating machine. The bottles are decorated while horizontally orientated and then delivered from the decorating machine by a transfer device to a discharge conveyor. The transfer device orientates the bottles from the horizontal to the vertical for conveyance by the discharge conveyor. When the rate at which bottles are fed through the decorating machine increases, there is also the need to captivatingly hold the bottle while supplied by the the feed conveyor to the conveyor of the decorating machine and while transported by the conveyor of the decorating machine to the delivery conveyor. Also, the motions necessary to grip and release the workpiece during these transferring operations must be executed with great precision to insure successful handling of the workpiece that necessarily requires that the workpiece be taken from the freestanding vertically, stable attitude, re-orientated to the horizontal and placed in a wholly confined driven conveyor and taken from the driven conveyor, re-orientated from the horizontal to again regain a free-standing vertically, stable attitude.

It is an object of the present invention to provide a method and apparatus for adjusting the conveyance speed and at the same time stabilizing a workpiece particularly a bottle during delivery from and, if desired, delivery to a decorating machine.

It is a further object of the present invention to provide, in a decorating machine, horizontal workpiece carriers continuously advanced except at each of a plurality of spaced decorating stations and a registration station wherein the latter establishes the registration of the workpiece orientation at a reduced clamping pressure on the carriers which is restored to a predetermined clamping pressure for receiving decoration at each of the subsequent decorating stations.

SUMMARY OF THE INVENTION

According to the present invention there is the combination of a workpiece steady in the flow path of a workpiece delivery conveyor to handle workpieces carried by a decorator conveyor of a decorating machine, a plurality of workpiece stabilizers to drivingly support workpieces during a change to a workpiece speed of travel along the workpiece delivery conveyor, each of the workpiece stabilizers including a cam follower and stabilizer guides, and at least one workpiece drive cam having a cam track receiving the cam followers for changing the speed of travel by workpieces between an entry speed and a discharge speed, one such speed corresponds to and the other speed differs from the conveyance speeds by the workpiece delivery conveyor, a space between the consecutively advancing workpieces along the workpiece drive cam ever changing by the change to the speed of travel by the consecutively advancing workpiece stabilizers.

Preferably, the combination according to the present invention further includes conveyance guides engaged with the workpiece stabilizers for maintaining the cam followers drivingly engaged with the cam track. The conveyance guides may be embodied as guide rollers mounted on the workpiece stabilizers for orbiting endless cam tracks in spaced apart horizontal housing plates of the workpiece stabilizers. The present invention is particularly useful for stabilizing workpieces undergoing a change of speed either at the entry end of a decorating machine or at the delivery end of the machine where the workpiece is accelerated to the thru put speed at the entry end and decelerated to a desired transport speed for more densely populating the delivery conveyor with workpieces.

Additionally, the present invention provides an apparatus to establish a predetermined orientation of a surface of a workpiece to receive decoration relative to screen printing stations of an intermittent decorating machine, the intermittent decorating machine having a plurality of decorating stations preceded by a registration station and all horizontally spaced along a workpiece feed cam, the feed cam includes a continuous motion cam track constructed with a dwell period at each of the stations for independently presenting a workpiece on a horizontal carrier to register the orientation of the workpiece and apply decoration to the workpieces on the horizontal carriers. The apparatus is preferably provided with an operating system and a registration station to reduce the clamping pressure applied to the workpieces when registration of the workpiece orientation occurs. In its most preferred form, the workpieces undergo continuous advancing movement in the decorating machine except only at workstations for registration and decorating of the workpieces. In a machine of this type, workpieces are fed with continuous motion to the decorating machine and discharge by continuous motion from the machine.

BRIEF DESCRIPTION OF THE DRAWINGS

The present invention will be more fully understood when the following description is read in light of the accompanying drawings in which.

DETAILED DESCRIPTION OF THE EMBODIMENT OF THE INVENTION

Figure 1:
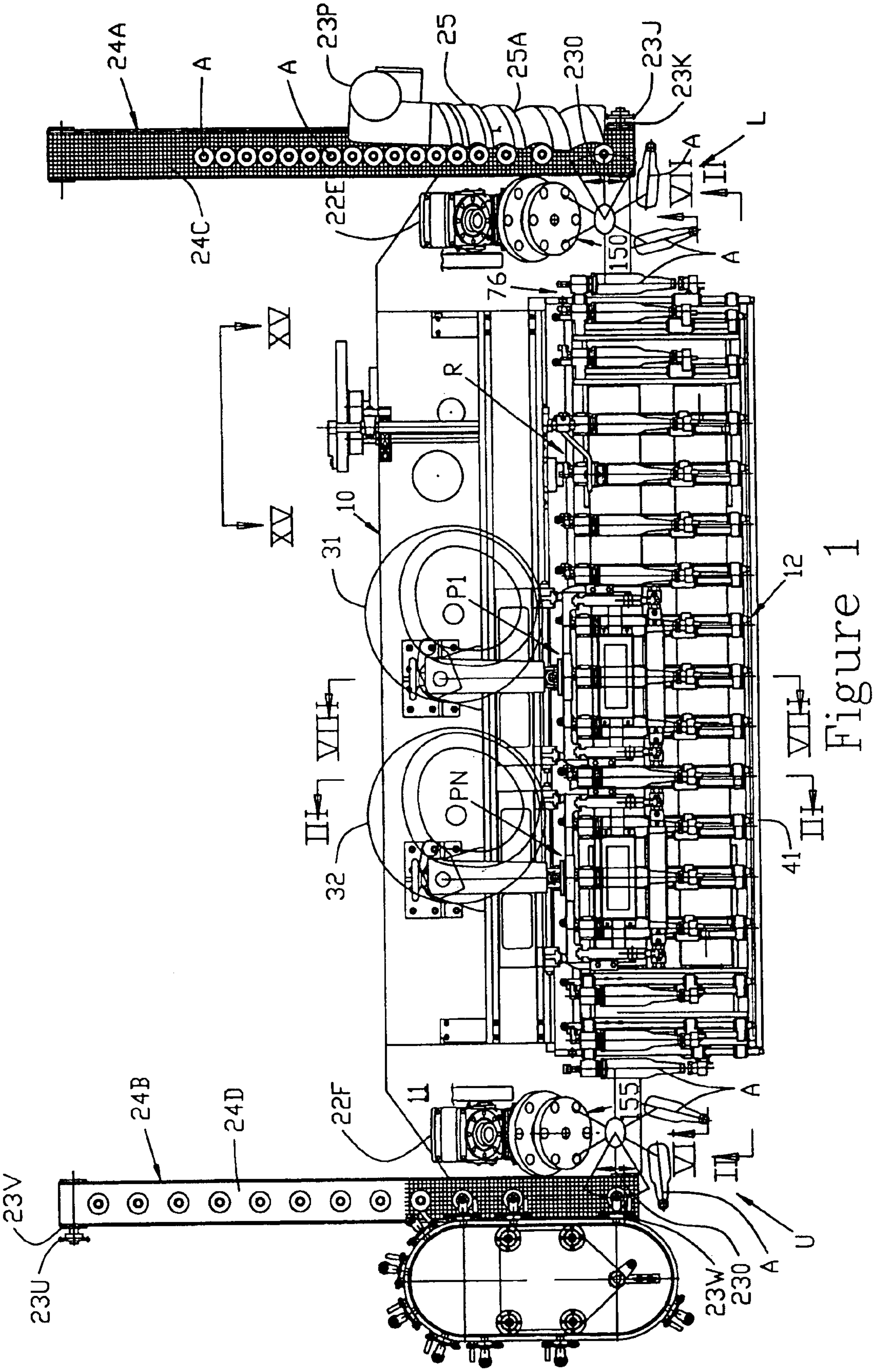
FIG. 1 is a plan view of a decorating machine according to a first embodiment of the present invention.
Figure 2:
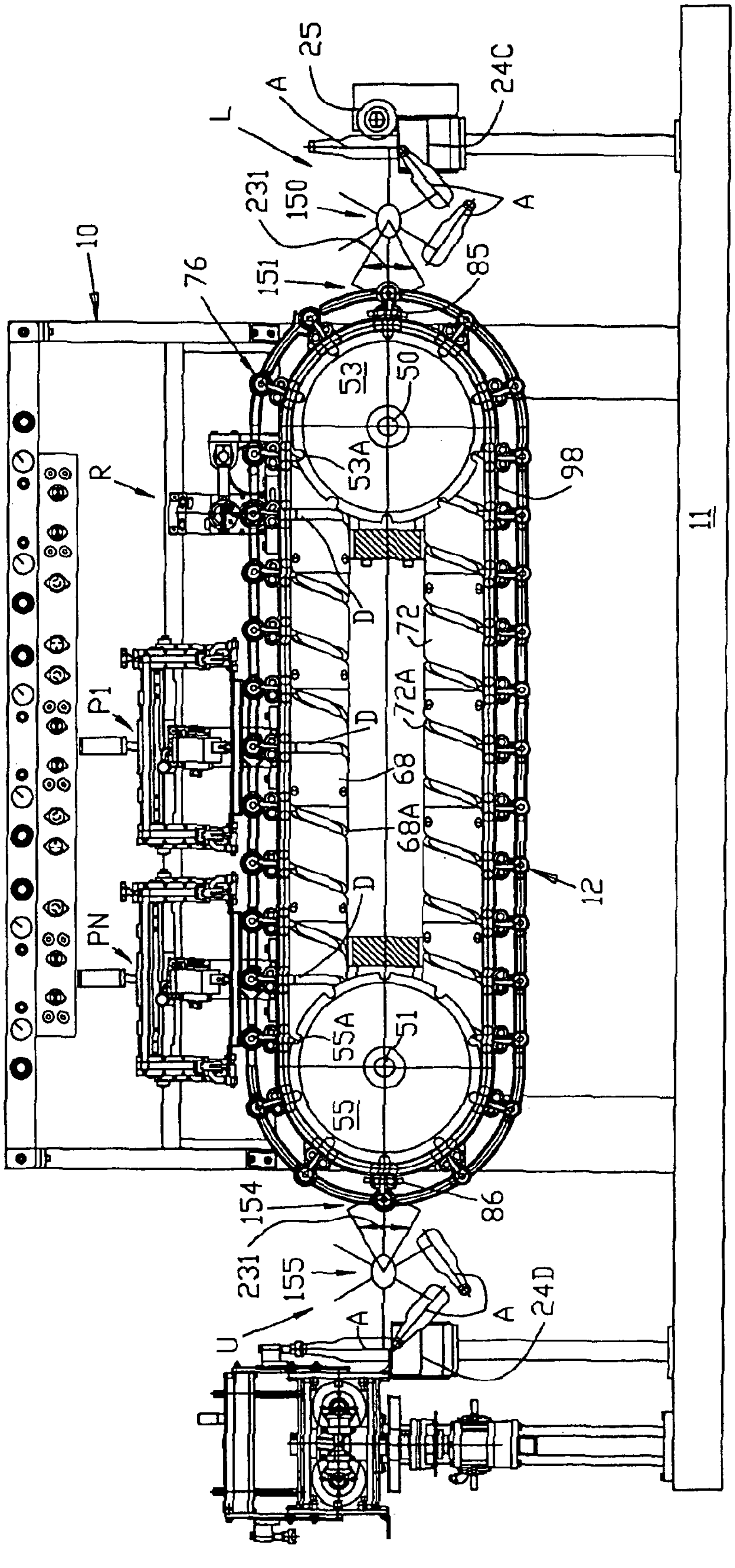
FIG. 2 is a front elevational view of the decorating machine shown in FIG. 1.

Referring now to FIGS. 1 and 2 of the drawings, there is illustrated a decorating machine 10 having a base 11 for supporting a workpiece conveyor 12 to convey workpieces, which, for describing the preferred embodiment of the present invention, consist of glass bottles. The bottles each have an elongated longitudinal axis A extending centrally in a uniformly spaced relation from the center of the bottle and centered along the elongated length of the bottle. The axis A of a bottle is changed from the vertical to the horizontal by bottle loading equipment L and remains horizontal while the bottles are conveyed by conveyor 12 along a plurality of machine stations which for the purpose of disclosing the present invention comprise a registration station R and a plurality of successively arranged decorating stations of which only inline decorating stations P1 and P2 are shown. However, the number of inline decorating stations comprises P1–PN where N is the number of decorating stations each selected to supply ink of a selected color to form the final decoration on the glass bottle. The number of inline machine stations may, if desired, also include a machine station immediately following each decorating station for inline curing of applied ink with ultraviolet/heat radiation. For the purpose of disclosing the present invention the decorating machine is provided with the inline registration station R and inline decorating stations P1 and P2. The bottles are advanced from the last inline machine station PN to bottle unloading equipment U.

The drive arrangement for the bottle loading equipment L, the decorating machine and the bottle unloading equipment U include, as shown in FIGS. 3–6, a main drive motor 14 having a drive output shaft connected by a belt 14A to a first line shaft 15 rotatably supported by spaced apart pillow blocks 15A. Spaced along line shaft 15 are five drive output pulleys 16, 17, 18, 19 and 20 provided with belts 16A, 17A, 18A, 19A and 20A, respectively. The belt 20A extends to a pulley on a second line shaft 21 supported by spaced apart pillow blocks 21 A and used to drive the bottle loading equipment L and unloading equipment U. For this purpose, drive output pulleys 22A and 22B are connected by belts 22C and 22D, respectively, to drive input shafts of cone worm drives 22E and 22F for workpiece transfer apparatus forming part of the bottle loading equipment L and bottle unloading equipment U. Also driven by the second line shaft 21 are sprockets 23A and 23B connected by drive chains 23C and 23D to sprockets 23E and 23F, respectively, mounted on drive input shafts for supply and delivery conveyors 24A and 24B, respectively.

The sprocket 23A, drive chain 23C and sprocket 23E for supply conveyor 24A supply drive torque to a drive shaft 23G which is transferred by drive sprocket 23H through an idler shaft 23I having input and output sprockets connected by chains for driving a sprocket 23J mounted on a drive roller 23K. The drive roller 23K is mounted for rotation at a spaced site from an idler roller 23L to support an endless belt 24C moving at a constant rate of travel to advance undecorated bottles along the course of travel established by the conveyor belt. Drive shaft 23G is also provided with a drive gear meshing with a drive gear 23M on an idler shaft on which there is also mounted a sprocket for a drive chain 23N used to provide torque to an input shaft for a drive 23P. The drive output gear of the drive 23P is mounted to the end of a timing screw 25 having a helical groove 25A for controlling the advancing movement of the bottles by the conveyor as will be described in detail hereinafter.

The sprocket 23B, drive chain 23D and sprocket 23F of the delivery conveyor 24B supply torque to a drive shaft 23Q which is transferred by meshing drive gears 23R to an idler shaft 23S having a drive output sprocket 23T connected by a chain to a sprocket 23U mounted on a drive roller 23V. The drive roller 23V mounted for rotation at a spaced site from an idler roller 23W for supporting an endless belt 24D used for discharging decorated bottles along the course of travel for handling and shipping. Drive shaft 23Q is elongated to provide a mounting site for a sprocket 23X connected by a drive chain 23Y to a cone worm drive 23Z for a bottle steady apparatus S. While the bottle supply conveyor 24A utilizes a horizontally orientated endless belt 24C for supporting bottles, the present invention is equally applicable for use with other forms of a conveyor having, for example, bottle carriers to support bottles in alternative ways which include, for example, bottle carriers on supply and delivery conveyors extending along a lateral side or above the conveyance paths for the bottles.

The belt 16A connects pulley 16 mounted on line shaft 15 to an index drive 16B. The index drive 16B has an output shaft on which is mounted a gear 16C meshing with gear 16D provided with a sprocket 16E. A chain 16F interconnects the sprocket 16E and a sprocket 16G mounted on a registration drive shaft 16H. Also mounted on the drive output shaft of index drive 16B is a cam 16I having a closed cam track 16J containing a cam follower connected by a drive arm 16K to oscillate a shaft 16L secured to a registration head 16M by an arm 16N.

Figure 3:
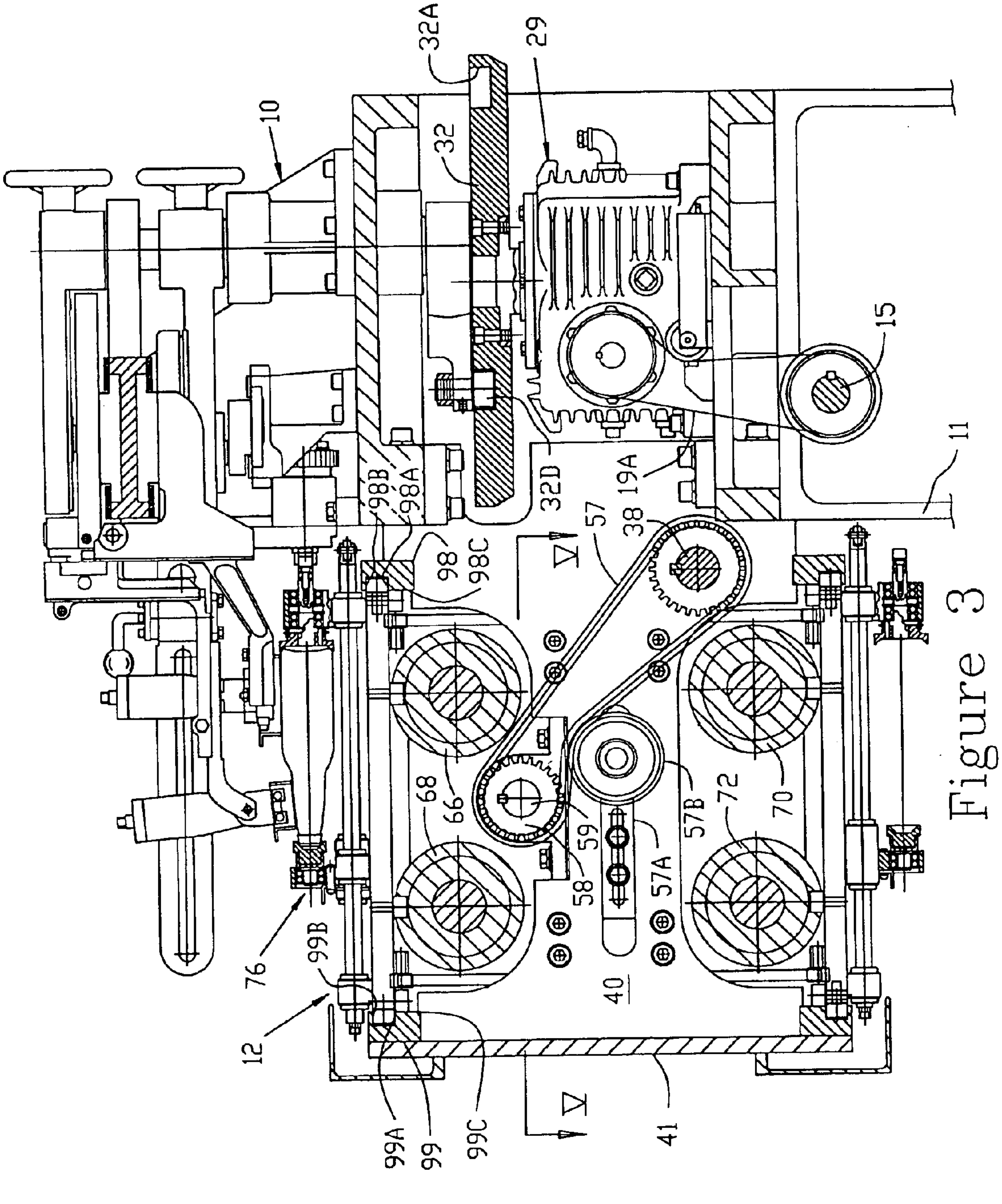
FIG. 3 is a sectional view taken along lines III—III of FIG. 1.
Figure 4:
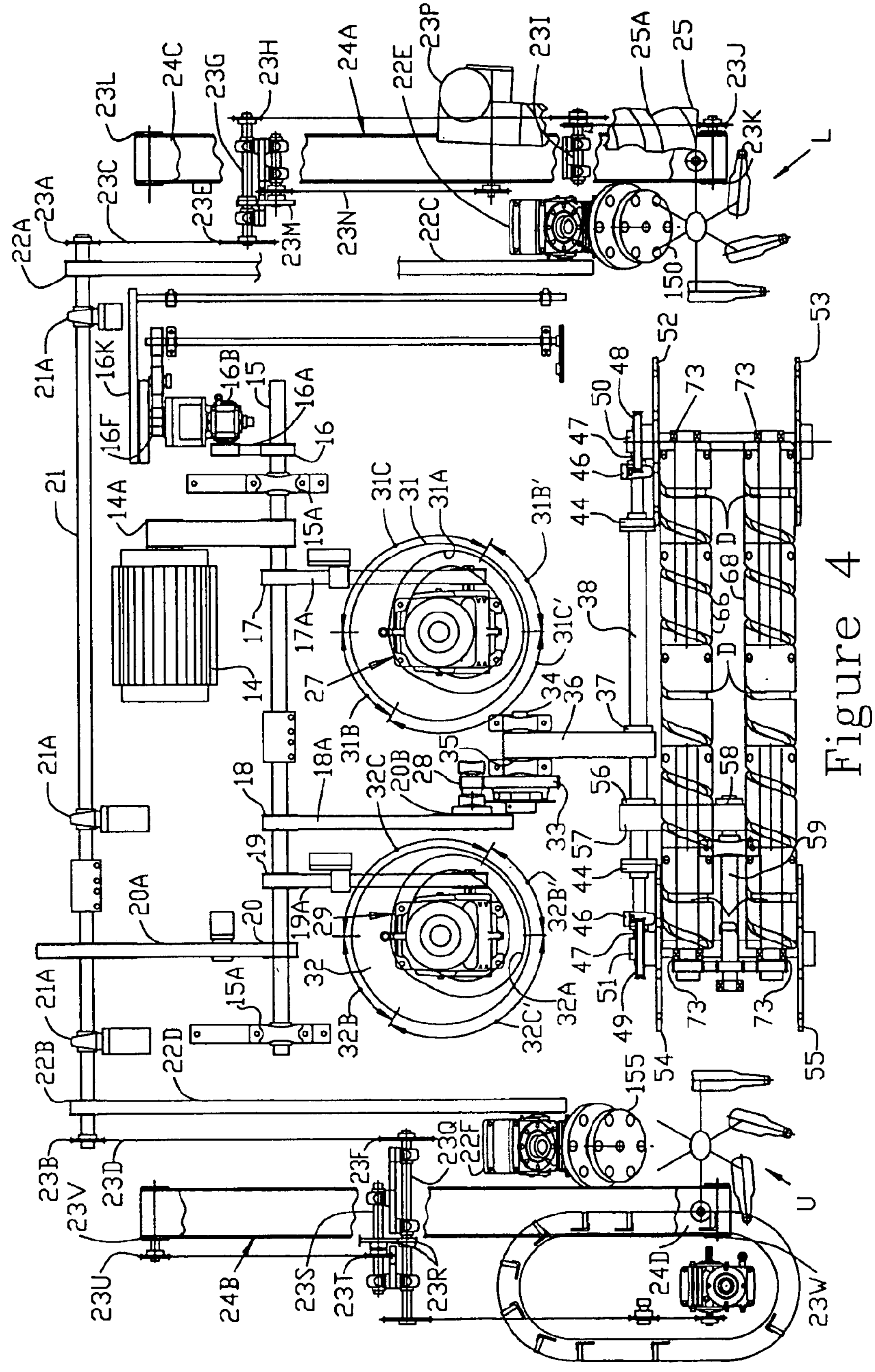
FIG. 4 is a schematic drive layout illustrating the major drive components comprising the decorating machine and the supply and delivery apparatus for a bottle workpieces.

The belts 17A and 19A extend to gear drives 27 and 29, respectively, having output shafts secured to rotate cams 31 and 32 (FIGS. 1, 3 and 4). The cams 31 and 32 are formed with closed cam tracks 31A and 32A also known as face grooves or positive cams. Bottles are decorated at each decorating station in an identical fashion by initiating screen travel when a bottle arrives at the decorating station. FIG. 4 il1ustrates the cam tracks 31 A and 32A of the respective cams. Each cam track is constructed to form two bottle decorating cycles each separated by a screen dwell cycle. More specifically, cam track 31A consists of a screen dwell cycle 31B. bottle decorating cycle 31C, screen dwell cycle 31B', and a bottle decorating cycle 31C'. Cam track 32A consists of a screen dwell cycle 32B, bottle decorating cycle 32C, screen dwell cycle 32B', and a bottle decorating cycle 32C'. In the first bottle decorating cycle, the decorating screens at each decorating station P1 and P2 are linearly displaced in one direction during which decoration is applied to a bottle at each decorating station. After these bottles are decorated, the screens remain stationary during screen dwell cycles and then the screens are reciprocated in the opposite direction during which decoration is applied to succeeding bottles at each decorating station. The cam tracks 31 A and 32A define the precise occurrence of events with respect to the movement of the bottles by the workpiece conveyor 12 since the cams 31 and 32 and the workpiece conveyor are interconnected in the same drive train and driven by the same main drive motor 14. Each cam has a follower in the respective cam track to pivot an oscillating drive output at each of the decorating stations as will be discussed in detail hereinafter. The belt 18A driven by the first line shaft 15 extends to a pulley 20B mounted on a rotatably supported shaft having a gear 28 meshing with a gear 33. Gears 28 and 33 form a speed reduction relationship. Gear 33 is mounted on an intermediate shaft 34 supported by pillow blocks and having a pulley 35 provided with a belt 36 extending to a pulley 37 mounted on a third line shall 38.

Figure 5:
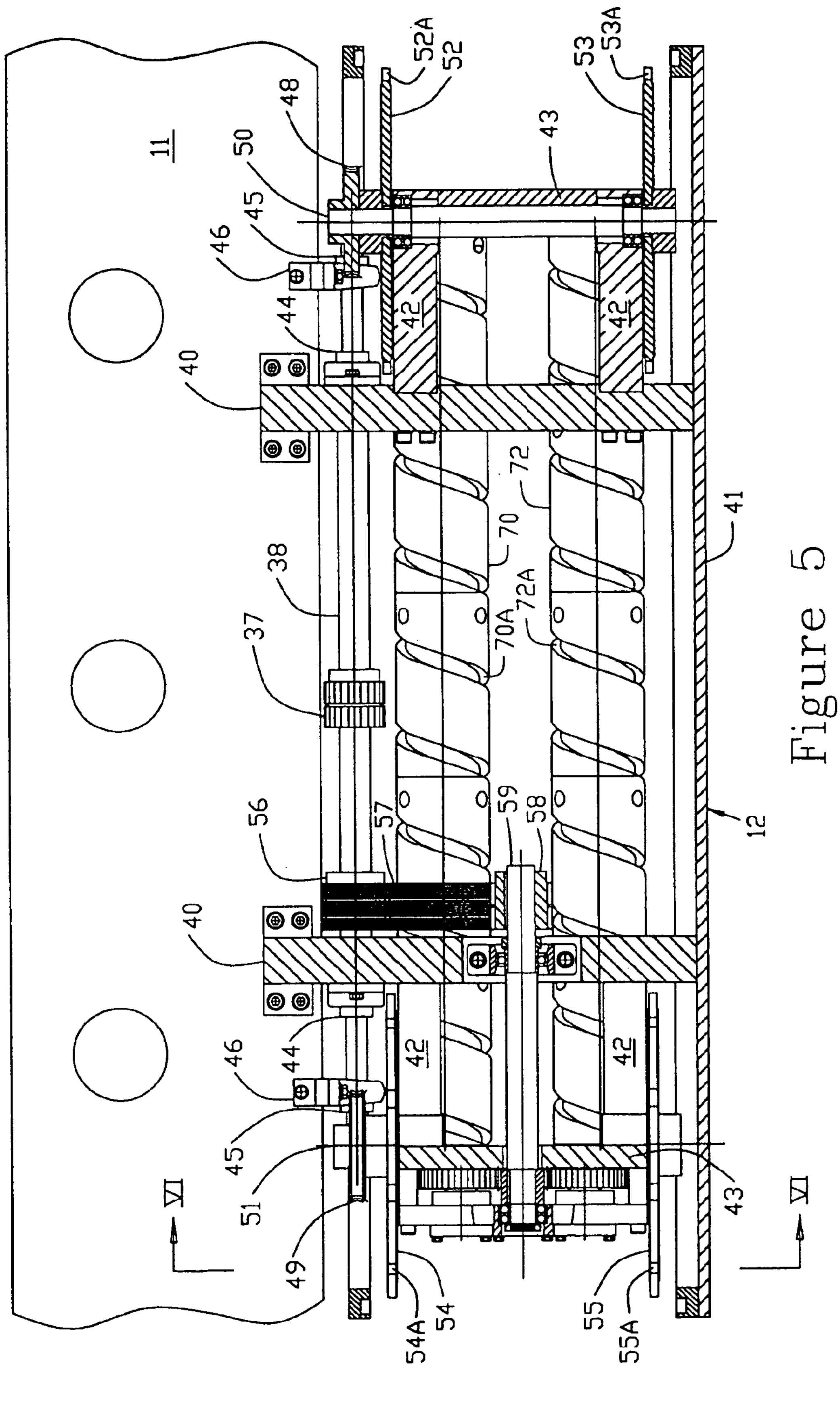
FIG. 5 is a plan view taken along lines V—V of FIG. 3.
Figure 6:
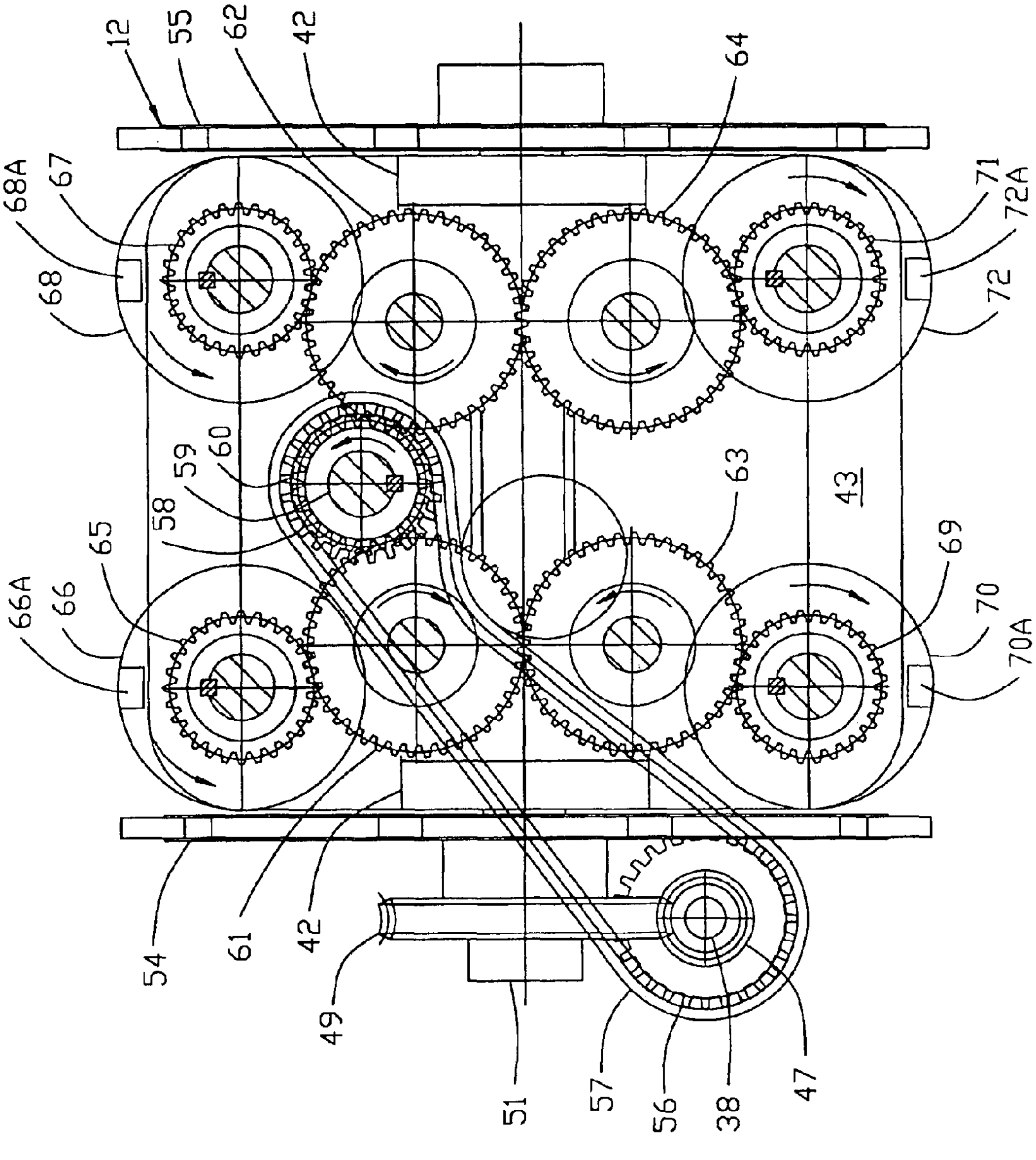
FIG. 6 is an enlarged end elevational view taken along lines VI—VI of FIG. 5.
Figure 7:
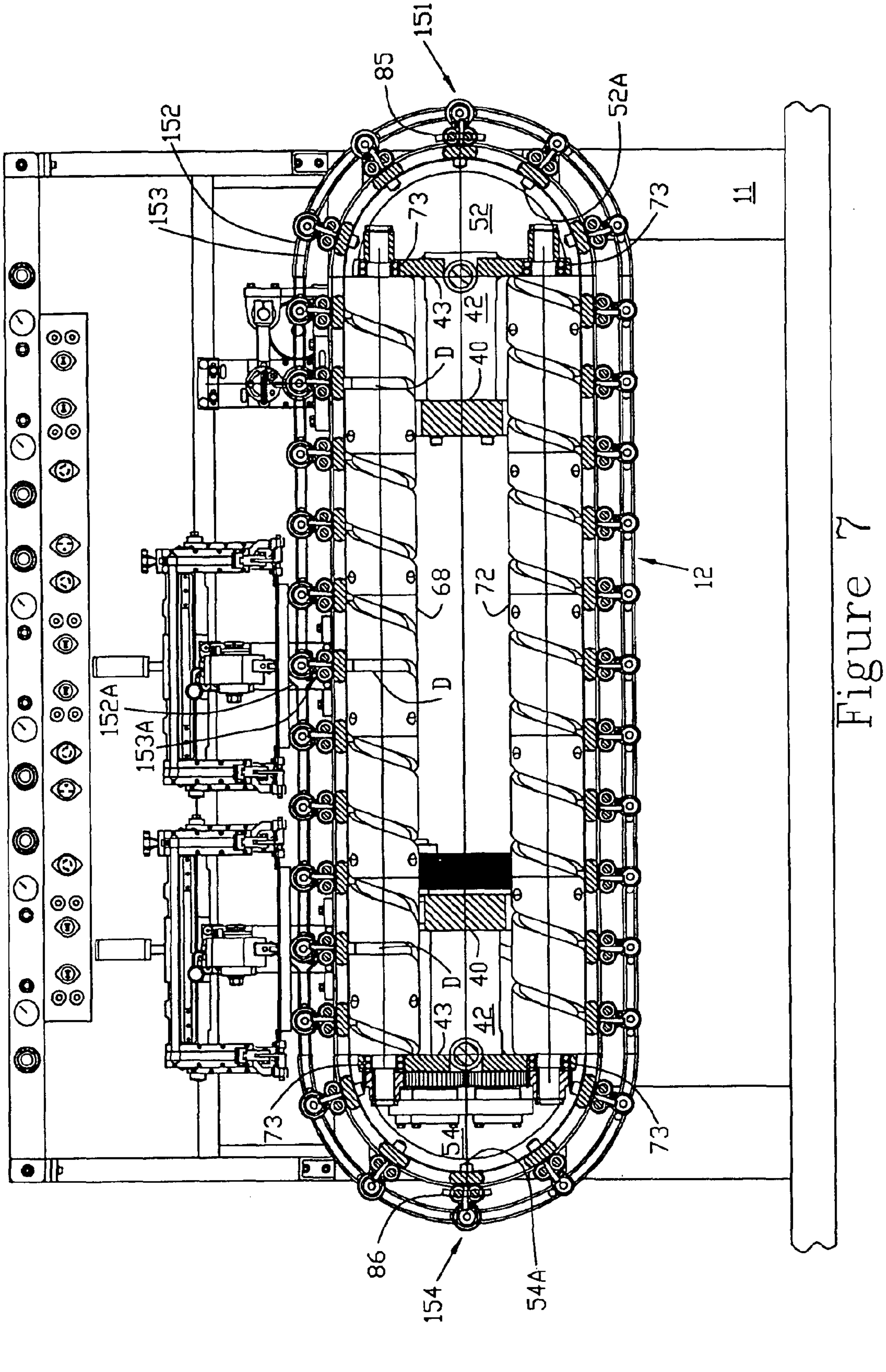
FIG. 7 is an elevational view in section taken along lines VII—VII of FIG. 1.

As shown in FIGS. 3, 5 and 7, line shaft 38 is rotatably supported by two spaced apart arms 40 extending from the base 11 in a cantilever fashion and secured by bolts to the base of the decorating machine. The outer most ends of the arms 40 are connected to an elongated cover plate 41. As shown in FIGS. 5, 6, 7 and 8, secured to each of the arms 40 are spaced apart spacers 42 that extend horizontally and outwardly in opposite directions from the arms 40. The outer ends of the spacers 42 carry vertically extending mounting plates 43 from which various drive gears project only at the unload end of the conveyor. As shown in FIGS. 4 and 5, the third line shaft 38 is rotatably supported by bearings 44 mounted on portions of the arms 40 adjacent the base 11 and latterly outwardly of each of the bearings 44 there is also a bearing assembly 45 mounted by a carrier bracket 46 to the base 11. The bearing assemblies 45 rotatably support the outer end portions of the third line shaft 38. As shown only in FIGS. 4 and 6, mounted on each of the terminal end portions outwardly of each bearing assembly 45 of the third line shaft 38 are worm gears 47. A worm gear 47 near the bottle loading equipment L meshes with a gear wheel 48 and the worm gear 47 at the unloading end of the decorating machine meshes with a gear wheel 49. The gear wheels 48 and 49 are mounted on drive shafts 50 and 51, respectively.

As best shown in FIGS. 3,4 and 5 spaced apart horizontal carrier supply disks 52 and 53 are mounted on the inboard and outboard ends, respectively, of drive shaft 50 and spaced horizontal carrier return disks 54 and 55 are mounted on the inboard and outboard ends, respectively, of drive shaft 51. A pulley 56 is mounted on the third line shaft 38 and joined by a drive belt 57 to a pulley 58 mounted on a drive shaft 59 extending horizontally above the drive shaft 51. Tension in the drive belt 57 is controllably set by using fasteners to secure a roller support arm 57A, FIG. 3, rotatably supporting a slack adjusting roller 57B in a fixed position to arm 40 for establishing the position for roller 57B to impose a desired tension on belt 57. As shown in FIG. 6, a drive pinion gear 60 is mounted on the horizontally extended end of drive shaft 59 and meshes with idler gears 61 and 62, which in turn mesh with idler gears 63 and 64, respectively. Idler gear 61 meshes with a drive gear 65 mounted on a support shaft of a barrel cam 66; idler gear 62 meshes with a drive gear 67 mounted on a support shaft of a barrel cam 68; idler gear 63 meshes with a drive gear 69 mounted on a support shaft of a barrel cam 70; and idler gear 64 meshes with a drive gear 71 mounted on a support shaft of a barrel cam 72. As shown in FIGS. 4 and 7, the barrel cams 66, 68, 70, and 72 are rotatably supported by bearings 73 carried on the support shafts at opposite ends of the barrel cams. The bearings 73 are mounted in suitable apertures formed in the vertically extending mounting plates 43 such that the barrel cams can rotate about horizontal axes with the axes of barrel cams 66 and 68 lying in a common horizontal plane and there below the axes of rotation of barrel cams 70 and 72 lie in a common horizontal plane. Each of the barrel cams 66, 68, 70 and 72 have a closed cam track 66A, 68A, 70A and 72A which is a continuous groove milled in the cam body engaged by a roller attached to a follower for executing movements by horizontal bottle carriers as will be described in greater detail hereinafter to provide continuous traveling motion until interrupted by a dwell period "D" provided for the printing operation.

Figures 12A, 12B, 12C:
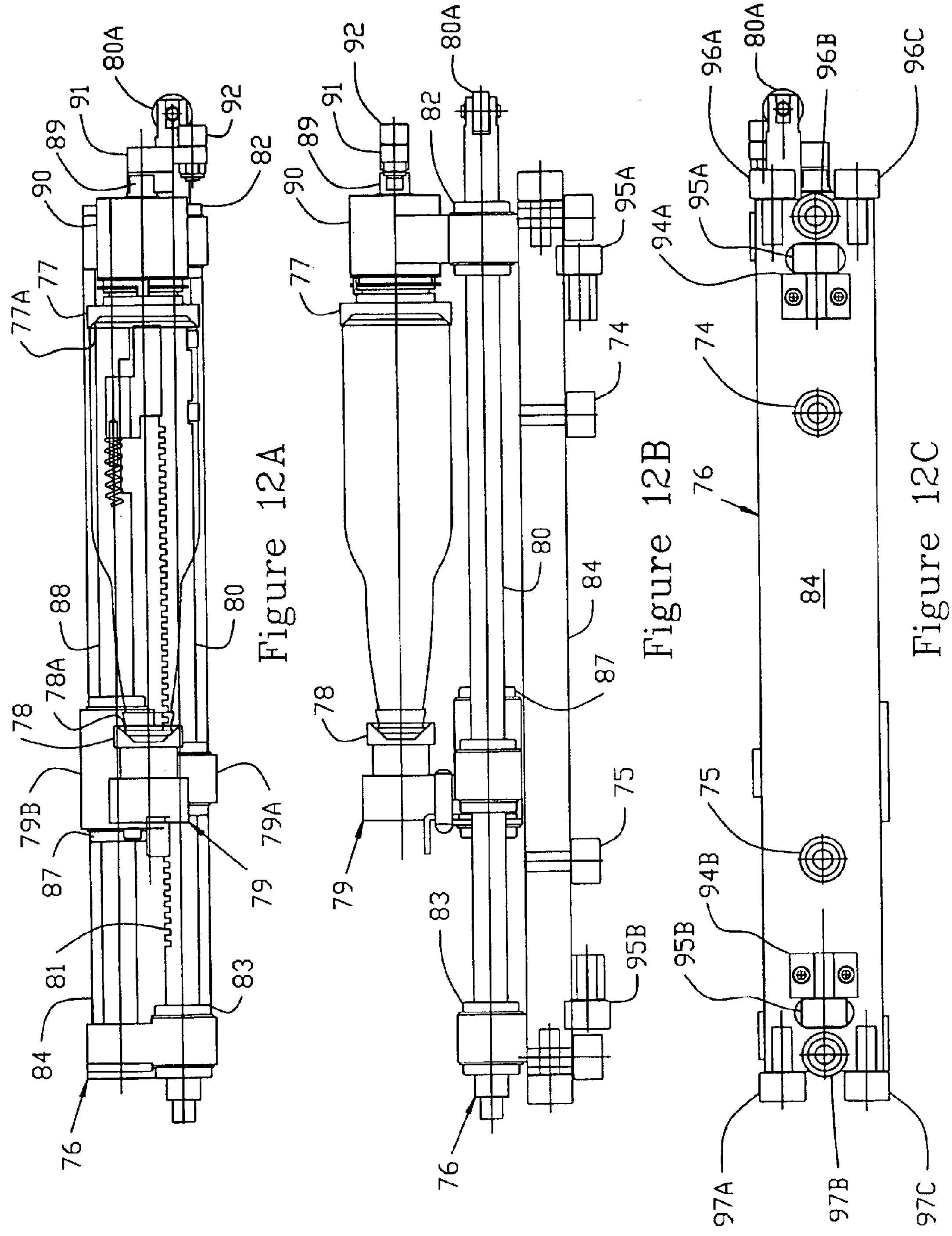
FIG. 12A is a plan view of a bottle horizontal carrier taken along lines XII-XII of FIG. 8.
FIG. 12B is a side elevational view of the bottle horizontal carrier shown in FIG. 12A.
FIG. 12C is a bottom plan view of the horizontal bottle carrier shown in FIG. 12A.

As shown in FIGS. 8 and 12A–12C, the closed cam tracks 66A, 68A, 70A, and 72A receive spaced apart roller parts of cam followers 74 and 75 mounted on each of a plurality of discrete and independently moveable horizontal bottle carriers 76. The details of the construction of the horizontal bottle carriers are best shown in FIGS. 12A–12C. Each horizontal bottle carrier is provided with a base cup 77 having a shallow support surface 77A surrounded by a protruding beveled edge to receive and center the base section of the bottle for rotation about the longitudinal central axis A of the bottle. A mouthpiece 78 has a shallow support surface 78A surrounded by a protruding beveled edge to receive and center the mouth of a bottle. Mouthpiece 78 is rotatably supported by neck chuck 79 having diverging support legs 79A and 79B. Leg 79A is selectively positionable along an actuator shaft 80 having teeth 81 for engaging a releasable latch to allow clamped positioning of the mouthpiece 78 relative to the base cup 77 at any of diverse sites to accommodate a particular height of a bottle between the base cup and mouthpiece. The actuator shaft 80 is slidably supported by spaced apart linear bearings 82 and 83 mounted on an elongated carrier plate 84. An actuator cam follower 80A is rotatably supported by an end portion of shaft 80, which protrudes from the bearing adjacent the base cup 77 for contact with cam surfaces 85 and 86 of actuator cams (FIG. 2) mounted on the base of the decorating machine at the entry and deliver ends thereof respectively. The cam surface 85 increases the distance separating the base cup 77 and the neck chuck 79 to allow loading of a bottle between the cup and chuck and similarly at the bottle-unloading site the cam surface 86 again increases the distance separating the base cup and the neck chuck to allow removal of the bottle from the horizontal carrier. The neck chuck 79 is provided with a linear bearing 87 resiliently supported by a support shaft 88.

As shown in FIGS. 12A–12C extending from the base cup 77 is a journal 89, which is rotatably supported by a bearing in an upstanding housing 90. An end part of the journal 89 is bolted to a crank arm 91 extending perpendicular to the rotational axis of journal 89. The free end of arm 91 supports a drive roller 92 for rotating the base cup and a bottle at each of the machine stations P1 and P2. Laterally outwardly from the cam followers 74 and 75 there are mounting blocks 94A and 94B secured to the bottom surface of the carrier plate 84. The mounting blocks 94A and 94B support rotatable follower rollers 95A and 95B, respectively, which pass into engagement with horizontally aligned cavities 52A and 53A distributed about the outer peripheral edges of the supply disks 52 and 53 when cam followers 74 and 75 exit cam tracks 70A and 72A of the barrel cams 70 and 72. Similarly, the follower rollers 95A and 95B, respectively, which pass into engagement with horizontally aligned cavities 54A and 55A distributed about the outer peripheral edges of horizontal carrier return disks 54 and 55 when cam followers exit cam tracks 66A and 68A of the barrel cams 66 and 68.

The horizontal bottle carriers are each sequentially transferred from an established positive driving relation with barrel cams 66 and 68 into a positive driving relation with horizontal carrier disks 54 and 55 and transferred by horizontal carrier disks 54 and 55 into a positive driving relation with barrel cams 70 and 72 and thence from barrel cams 70 and 72 to a positive driving relation with horizontal carrier disks 52 and 53 and completing a conveyance cycle transfer from horizontal carrier disks 52 and 53 into a positive driving relation with barrel cams 66 and 68. The cams to disks transfer of bottle carriers is always the same and the transfer of bottle carriers from disks to cams is always the same. The sequence of events for the transfer of bottle carriers from disks to cams is the reversal of the sequence of events for the transfer of bottle carriers from cams to disks. The bottle carrier transfer for one end of the bottle carrier is schematically shown in FIGS. 11A–11D for the disk 53 to barrel cam 68 via cam followers 95B and 75, and it is to be understood that the same relationship between disks 52, cam 66 and cam followers 74 and 95A at the end of the bottle carrier adjacent to the decorating machine.

Figure 11A:
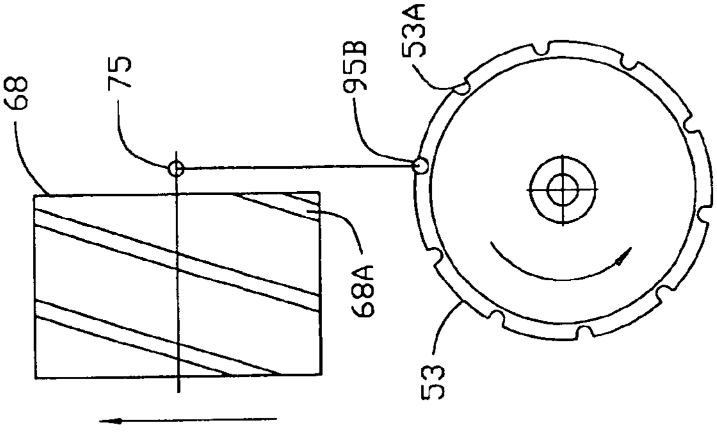
FIGS. 11A, 11B, 11C, and 11D are displacement diagram views illustrating the timing sequence for the conveyance control of a bottle horizontal carrier during transfer from a transfer disk to a barrel cam.
Figure 11B:
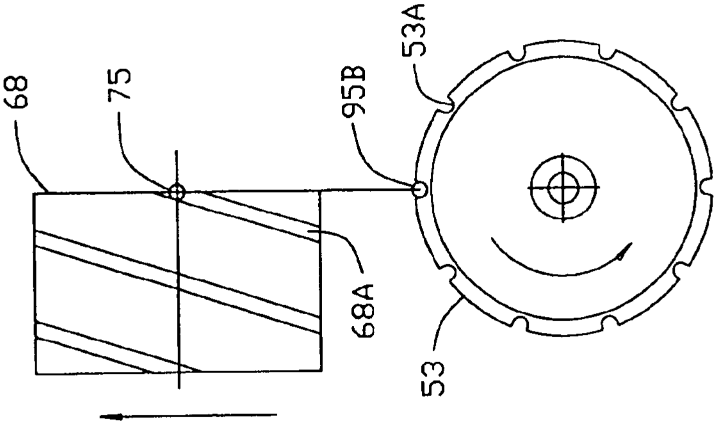
Figure 11C:
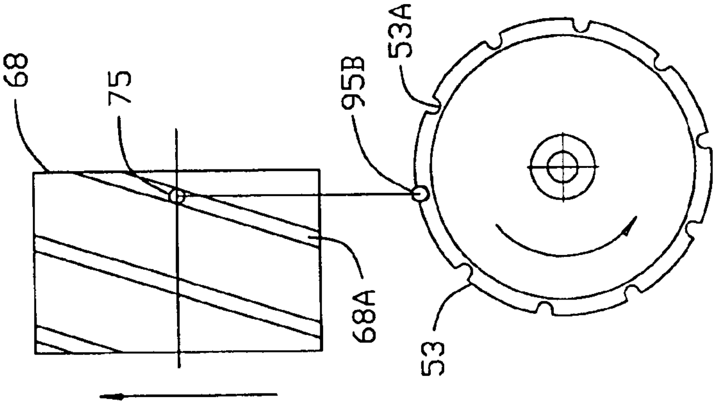
Figure 11D:
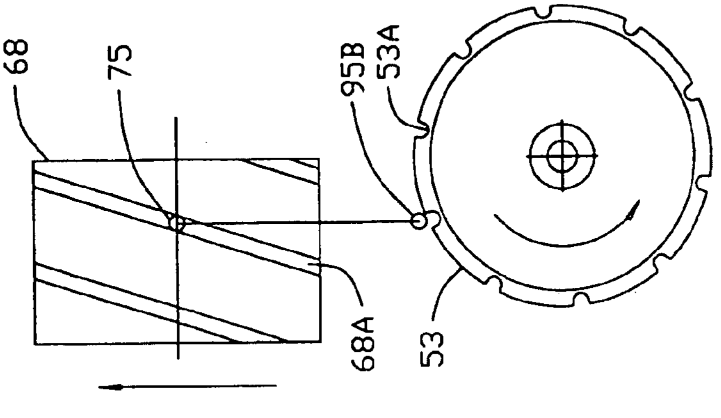

In FIG. 11A, the cam follower 95B is seated in cavity 53A of disk 53 and cam follower 75 resides at the entrance of cam track 68A in barrel cam 68. As shown in FIG. 11B, as disk 53 rotates counter clockwise, follower 95B is carried in cavity 53A to a 12 o'clock position of disk 53 and the barrel cam 75 rotates in the direction indicated by an associated arrow bringing the cam track 68A into a position so that the site for entrance to cam track 68A is positioned for entry of follower 75. As shown in FIG. 11C, continued rotation of the disk 53 and barrel cam 68 drives the cam follower 75 into and along cam track 68A of the cam 68 by continued advancing movement of follower 95B in cavity 53A while at the same time the cavity 53A of disk 53 recedes from the cam follower 95B. The bottle carrier transfer is completed, as shown in FIG. 11D, when the disk wall defining cavity 53A of disk 53 passes out of contact with cam follower 95B and at the same time cam follower 75 advances along cam track 68A of barrel cam 68 as shown.

Figure 9:
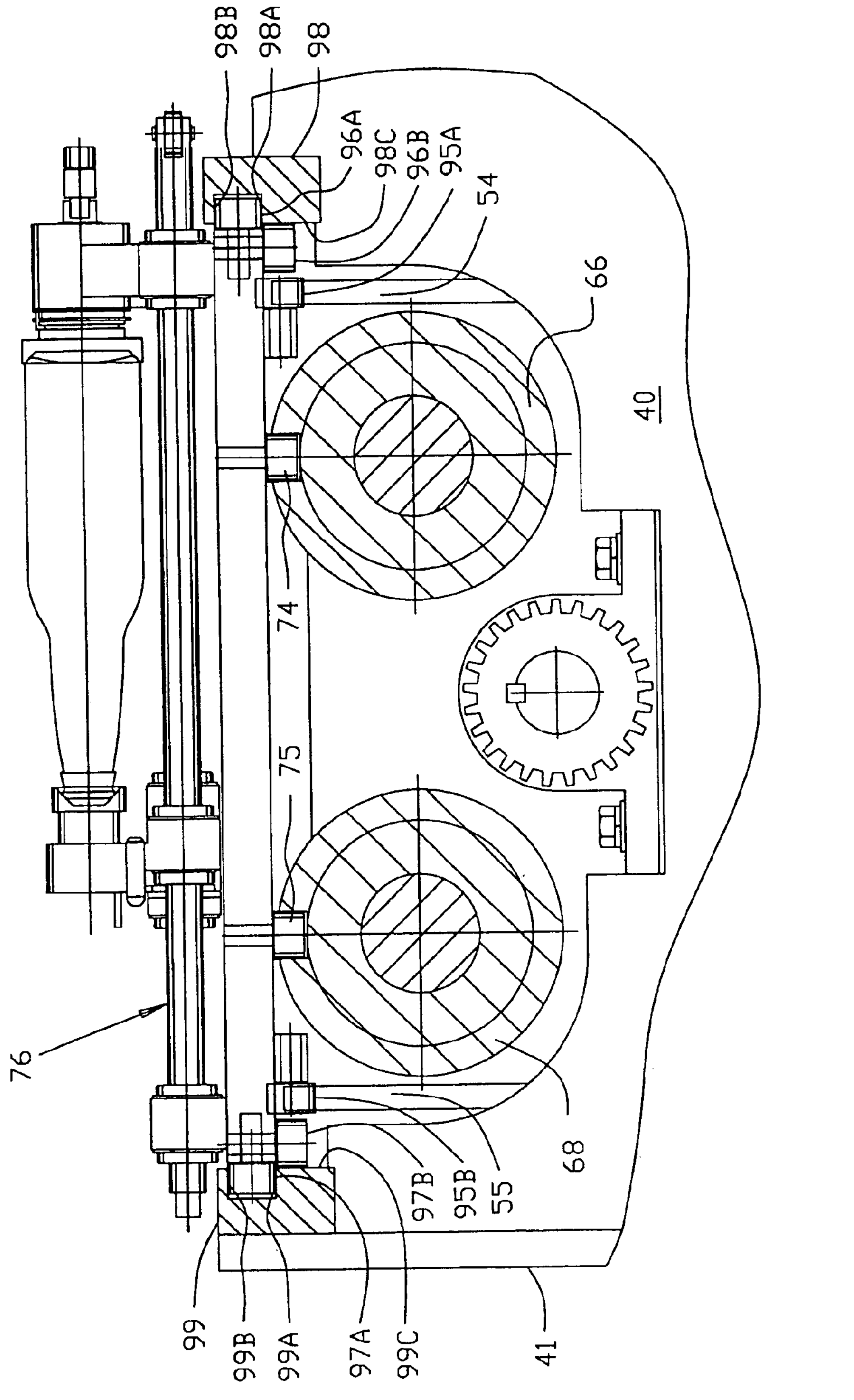
FIG. 9 is an enlarged view of the workpiece conveyance shown in FIG. 8.
Figure 10:
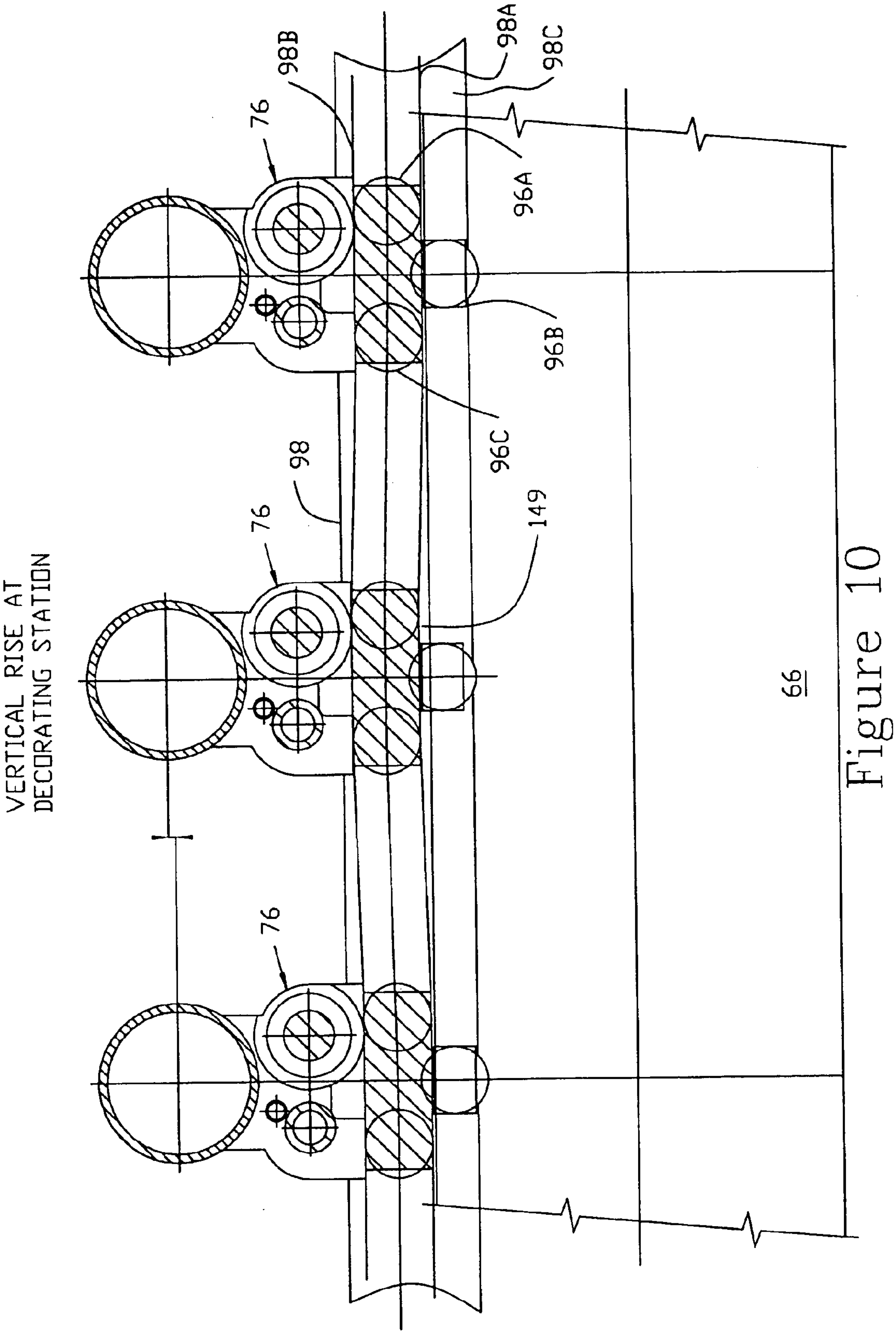
FIG. 10 is an enlarged elevation view in section at a decorating station taken along lines X—X of FIG. 8.

As shown in FIGS. 9, 10, 12B and 12C, a cluster of three spaced apart inboard guide rollers 96A, 96B and 96C are rotatably supported by the carrier plate 84 at its end most closely adjacent the decorating machine and a cluster of three spaced apart outer guide rollers 97A, 97B and 97C are rotatably supported by the carrier plate 84 at its end remote to the decorating machine. As best shown in FIGS. 9 and 10, secured to arms 40 extending from the decorating machine is an endless track plate 98 having a cavity wherein inboard guide rollers 96A and 96C engage opposed horizontal track surfaces 98A and 98B of the cavity. Guide roller 96B engages a vertical face surface 98C of the guide track. Secured to each of the arms 40 and plate 41 is an endless track plate 99 having a cavity wherein outer guide rollers 97A and 97C engage opposed horizontal track surfaces 99A and 99B of the cavity. Guide roller 97B engages a vertical face surface 99C of the guide track. The guidance provided by the cooperation between the guide rollers 96A, 96C, 97A and 97C which rotate about horizontal axes and the horizontal guide surfaces 98A, 98B, 99A and 99B provide load-bearing support for the horizontal carrier; maintain cam followers 74 and 75 engaged with the cam tracks of cam 66, 68, 70 and 72 and maintain the horizontal carrier in a stable orientation during movement along the cam track. Guide rollers 96B and 97B, which rotate about vertical axes, prevent unwanted displacement of the horizontal carrier between the guide tracks 98 and 99 in a longitudinal axis of a bottle when supported by the horizontal carrier.

Figures 13A, 13B, 13C, 13D, 13E:
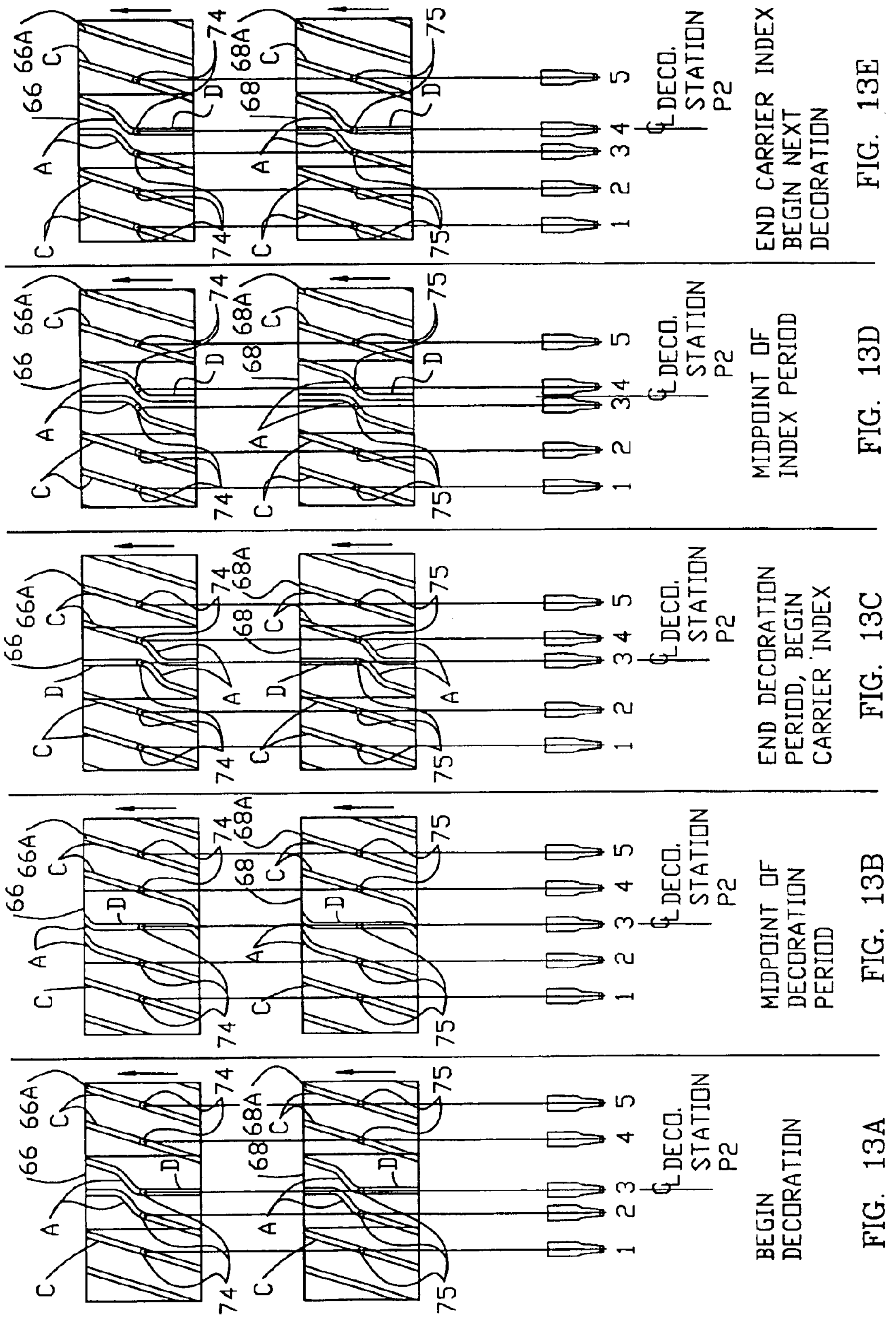
FIGS. 13A, 13B, 13C, 13D and 13E are timing sequence illustrations taken along lines XIII—XIII of FIG. 2 showing a cam track for imparting traveling motion and a dwell period in relation to a decorating station.

As can be seen from FIGS. 13A–13E, the motion imparted to each of the discrete horizontal bottle carriers is made up of three components namely, a continuous traveling motion "C", accelerated traveling motion "A", and dwell period "D" which are identified in relation to the schematic illustration of cam tracks in segments of barrel cams 66 and 68 upstream and downstream of a decorating station identified as P1. In each of the FIGS. 13A–13E five bottles, 1–5 are shown, in their relative spaced relation during advancement to and from a dwell period "D" at a decorating station. As described and shown previously, a cam follower 74 engages in a closed cam track 66A and cam follower 75 engages in closed cam track 68A. In FIG. 13A, a vertical line extends between a cam follower 74 and a cam follower 75 to bottle 1 and intended schematically to represent that bottle 1 is carried by a horizontal bottle carrier while advanced by barrel cams. Similar relations are illustrated concerning bottles 2, 3, 4 and 5. It is assumed for disclosure purposes that bottle 3 resides at the commencement of a dwell period "D" at the decorating station and the cam follower of the decorating machine resides at the commencement of the bottle decorating cycle 31C defined by the cam track 31A (FIG. 4). As the barrel cams 66 and 68 rotate in the direction indicated by arrows, bottle 3 remains stationary with respect to motion at the decoration station. Bottle 2 is at a site of exiting an accelerated travel motion "A" and entering cam track segment providing continuous traveling motion "C". The cam followers for bottles 1, 4, and 5 reside in cam track segments providing continuous traveling motion. In FIG. 13A bottles, 2 and 3 are more closely spaced than the relative spacing between the remaining bottles. The bottles maintain an equally spaced apart relation as shown in FIG. 13B where bottle 3 has resided about one-half through the dwell period and bottles 1, 2, 4 and 5 are advanced by motion imparted by the cam part segments of cams 66 and 68 providing the continuous travel "C" and the cam follower of the decorating machine resides midway along the bottle decorating cycle 31C defined by cam track 31A of cam 31. At the end of the dwell period for bottle 3 the cam follower of the decorating machine resides at the conclusion of the bottle decorating cycle 31C defined by the cam track 31A and as shown in FIG. 13C, bottles 1, 2, 4 and 5 continue in the cam segment providing continuous travel "C" whereby bottles 1 and 2 have moved away from bottle 3 and bottles 4 and 5 have moved toward bottle 3. The cam followers for the carrier of bottle 3 are at the entrance of cam track providing accelerated travel "A" and the cam followers for the carrier for bottle 4 are at but not in the segment of the cam track providing accelerated motion "A".

The cam follower of the decorating machine proceeds into the screen dwell cycle 31B defined by cam track 31A and remains in the screen dwell cycle until the arrival of a bottle at the dwell period "D" of the cams 66 and 68. As shown in FIG. 12D after bottle 3 has progressed in the accelerated travel motion "A", departing from the dwell period the cam followers for the carrier bottle 4 enter the accelerated travel motion "A" to rapidly introduce bottle 4 to the dwell period at the decorating station. In these relative motions, the distance between bottles 4 and 5 increases and the distance between bottles 3 and 4 decreases as depicted in FIG. 13E where bottle 4 arrives at the dwell period "D"at decorating station and bottle 3 emerges from the segment of the cam track providing acceleration and enters the segment of the cam track providing continuous traveling motion "C".

Figure 15:
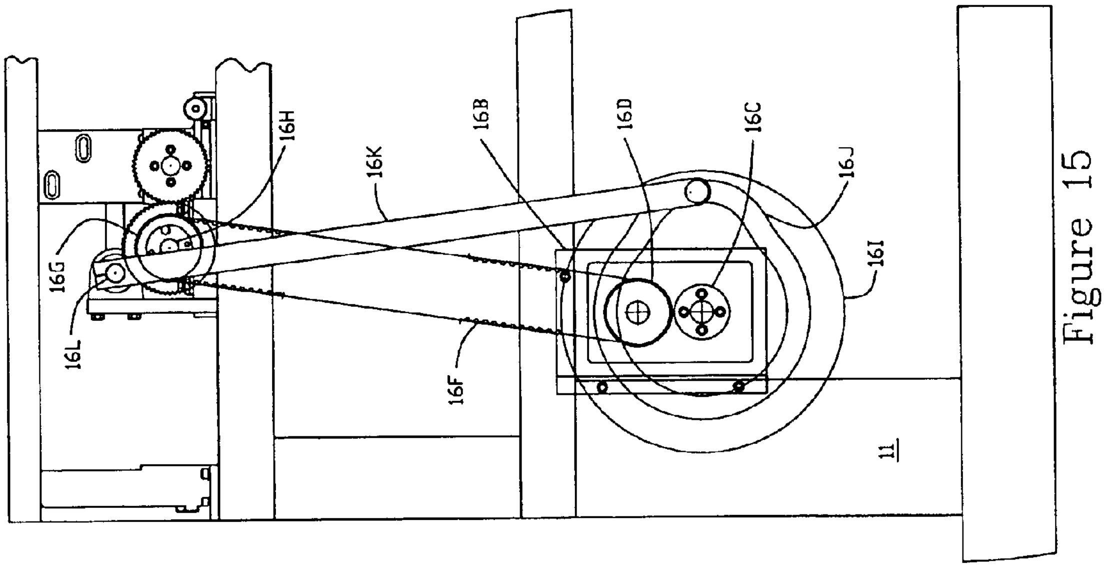
FIG. 15 is an elevational view taken along lines XV—XV of FIG. 1.
Figure 16:
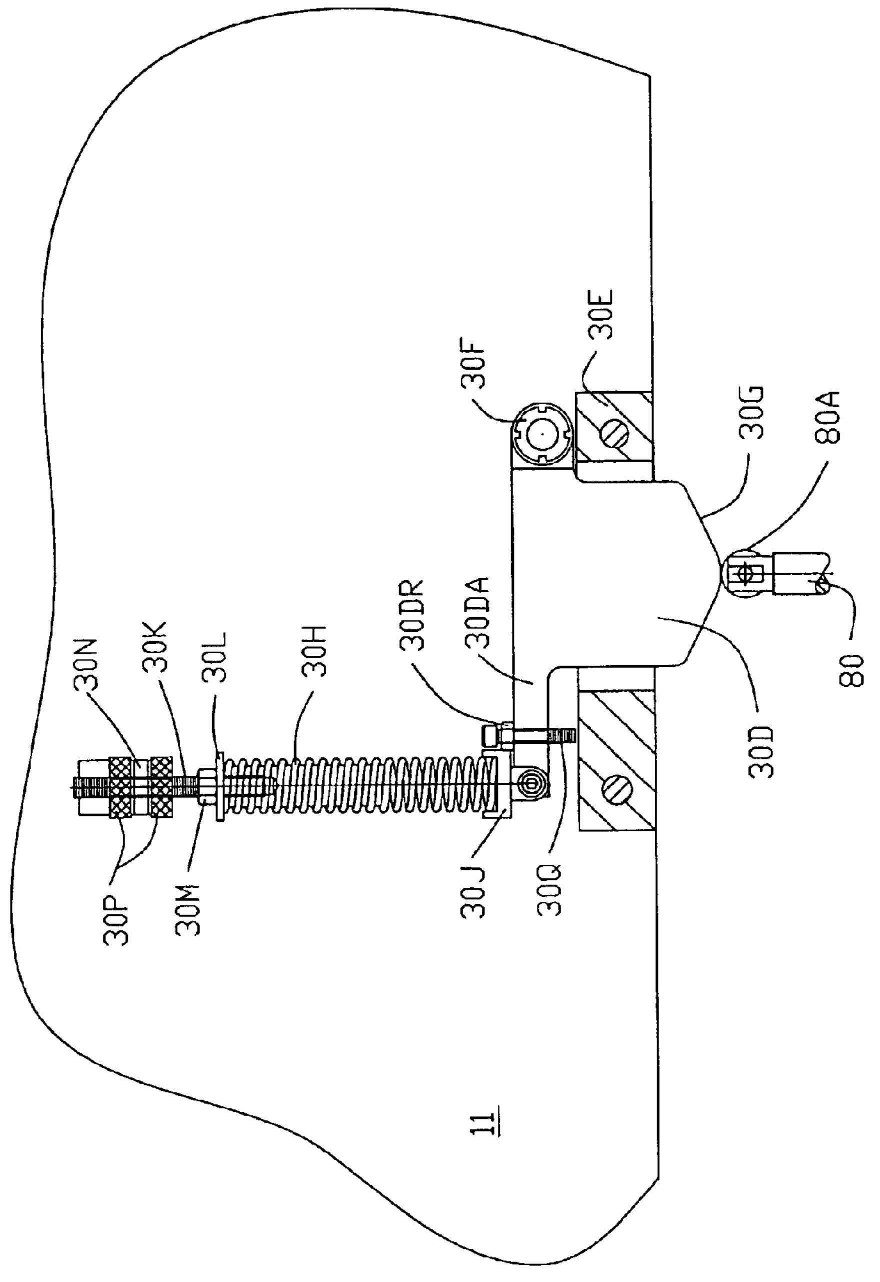
FIG. 16 is a plan view taken along lines XVI—XVI of FIG. 14.

As shown in FIGS. 2, 10 and 11, as the bottles are supplied by the bottle loading equipment L to the decorating machine, each bottle is arranged with the longitudinal axis A horizontally orientated when brought into a supported engagement between base cup 77 and mouthpiece 78 of a horizontal workpiece carrier 76 and thence advanced to the registration station R. As a bottle arrives at the registration station, the drive roller 92 on the end of the crank arm 91 passes into one of four peripherally spaced openings between drive blocks 30A secured to a face surface of a gear 30B. The gear teeth of gear 30B mesh with gear teeth of a gear 30C mounted on an end portion of registration drive shaft 16A which, as previously described, is driven by a chain drive arrangement shown in FIG. 15 connected to an index drive 16B. The bottle is rotated about its longitudinal axis by the bottle rotating drive gear 30B that rotates about a drive axis of gear 30B. A registration finger 16R is pivotally mounted on a finger mounting plate 16S at a predetermined location along a slotted end portion of a registration arm 16M so that the registration finger 16R extends into the path of travel of a registration cavity formed in the lower base portion of the bottle. The registration arm 16M is secured to the drive shaft 16L supported by bearings and driven by the pivot arm 16K as shown in FIG. 15 in response to oscillations produced by a follower in a closed cam track 16J also known as a face groove or positive cam driven by a drive output shaft of index drive 16B. The motion imparted to the registration arm 16M moves the registration finger into its operative position so that when the registration finger passes into the registration cavity of the bottle, rotation of the bottle is stopped thereby, and slippage occurs between the bottle base and the base cup 77 as the cup continues to rotate to completion of the bottle registration cycle.

Figure 14:
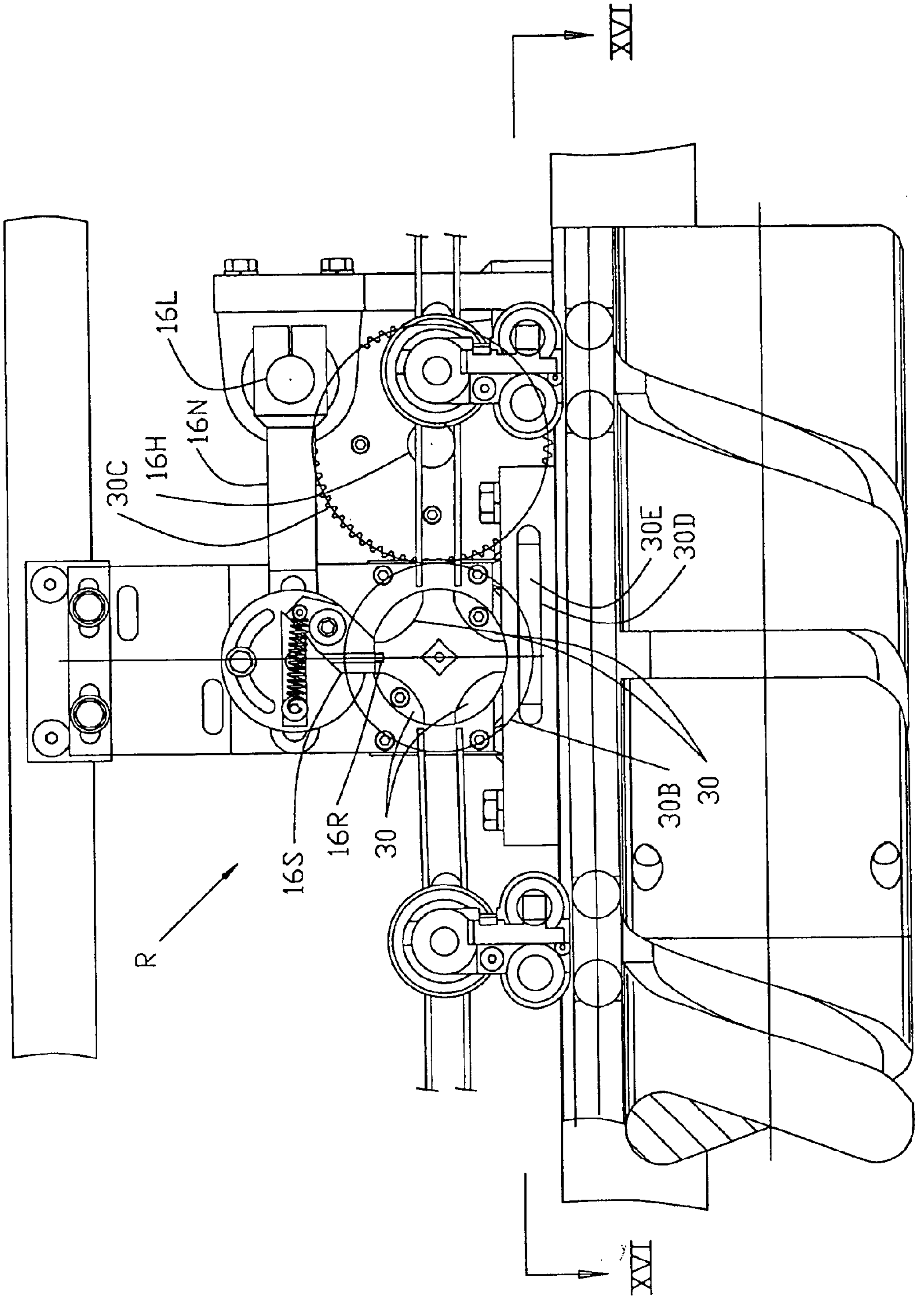
FIG. 14 is an enlarged elevation view of the registration station at the entry side of the conveyor for the decorating machine of the present invention.

A feature of the present invention provides that the clamping pressure applied by the mouth piece 78 and base cup 77 against the bottle to hold the bottle in place on the horizontal carrier is substantially reduced to a nominal pressure which is only sufficient to maintain the position of the bottle on the horizontal carrier during the time the bottle is rotated at the registration station R. The release of the clamping pressure on the bottle greatly reduces the breakaway frictional driving force by the base cup 77 and the vitreous bottle material when the registration finger 16R drivingly engages in registration cavity and stops rotation of the bottle. The registration cavity has a reduced wall thickness that is vulnerable to fracture when impacted by the registration finger and the continuing force prevents rotation of the bottle while the gear 30B continues to rotate to a start indexing position. As shown in FIG. 14 the diameter of gear 30B is relatively smaller than the diameter of gear 30C which produces a speed up relation causing the gear 30B to rotate through an angle greater than 360 degrees for each revaluation of gear 30C. This is necessary to assure that the rotation of the bottle stops at the same registration position to accommodate the random occurring position of the registration cavity in each bottle arriving at the registration station. The reduction to the clamping pressure is developed by a cam 30D supported in a cavity of a housing 30E by a vertically extending pivot shaft 30F secured the machine frame at a site to present a cam surface 30G protruding from a window opening in the housing into the path of travel by a cam follower 80A of a horizontal bottle carrier 76. The configuration of the cam surface 30G is designed to apply a resilient biasing force axially on the actuator shaft 80 at the exact location where the horizontal bottle carrier dwells during the registration process. The resilient force applied to the cam 30D is provided by a spring 30H seated at one end in the cavity of a cup shaped carrier 30J pivotally joined to a cantilevered arm section 3ODA of the cam 30D and overlying the housing 30E. The free end of the spring 30H is retained by a threaded shaft 30K protruding into the spring's helical configuration sufficiently to maintain contact by a washer 30L position by a nut 30M. The shaft 30K is mounted on a bracket 30N by nut members 30P at opposite sides of the bracket. The nut members 30P are advanced along the end position of the threaded shaft and tightened against opposite sides of the bracket to establish the resilient biasing force necessary to reduce the clamping pressure to the desired magnitude. A bolt 30Q is in threaded engagement with the cantilevered arm 30DA and arranged to abut against the overlying face surface of the housing 30E. A locknut 30R is used to secure the bolt 30Q at a position, which limits pivotal displacement of the cam 30D by the spring 30H.

When bottle rotation is stopped, there is established a predetermined bottle orientation with respect to the decorating screens because the decoration screens are also stationary at a start position at this time so that thereafter bottle rotation and linear screen movement are always in a synchronous speed relation. The registration process is particularly useful to orientate seam lines extending along opposite sides of a bottle with respect to the location of the desired area on the surface of the bottle intended to receive decoration. Registration of the bottle is concluded with the orientation of the crank arm 45 such that the drive roller 46 trails the advancing movement of the horizontal bottle carrier to each of the decorating stations. As the drive roller 46 emerges from a slot between the drive blocks 30, the roller 46 is captured and guided by spaced apart guide rails 93A and 93B. These guide rails extend along the course of travel by the drive roller 46 throughout the indexing movement by the conveyor to thereby maintain registration of the bottle at each decorating station. As shown in FIGS. 2 and 14, the guide rails 93A and 93B form an endless path to capture the roller 46 and thereby guide the crank arms 45 of each of the horizontal bottle carriers. However, at each of the decorating stations P1 and P2 the continuity of the guide rails 93A and 93B are interrupted by a gap wherein a rotator assembly 51 is located to receive and rotate the bottle. Downstream of each decorating station are outwardly protruding collector rail portions 93A and 94A that return the roller and crank arm to the gap between guide rails 93A and 93B as the conveyor operates to advance bottles after completion of the decorating cycles.

Figure 8:
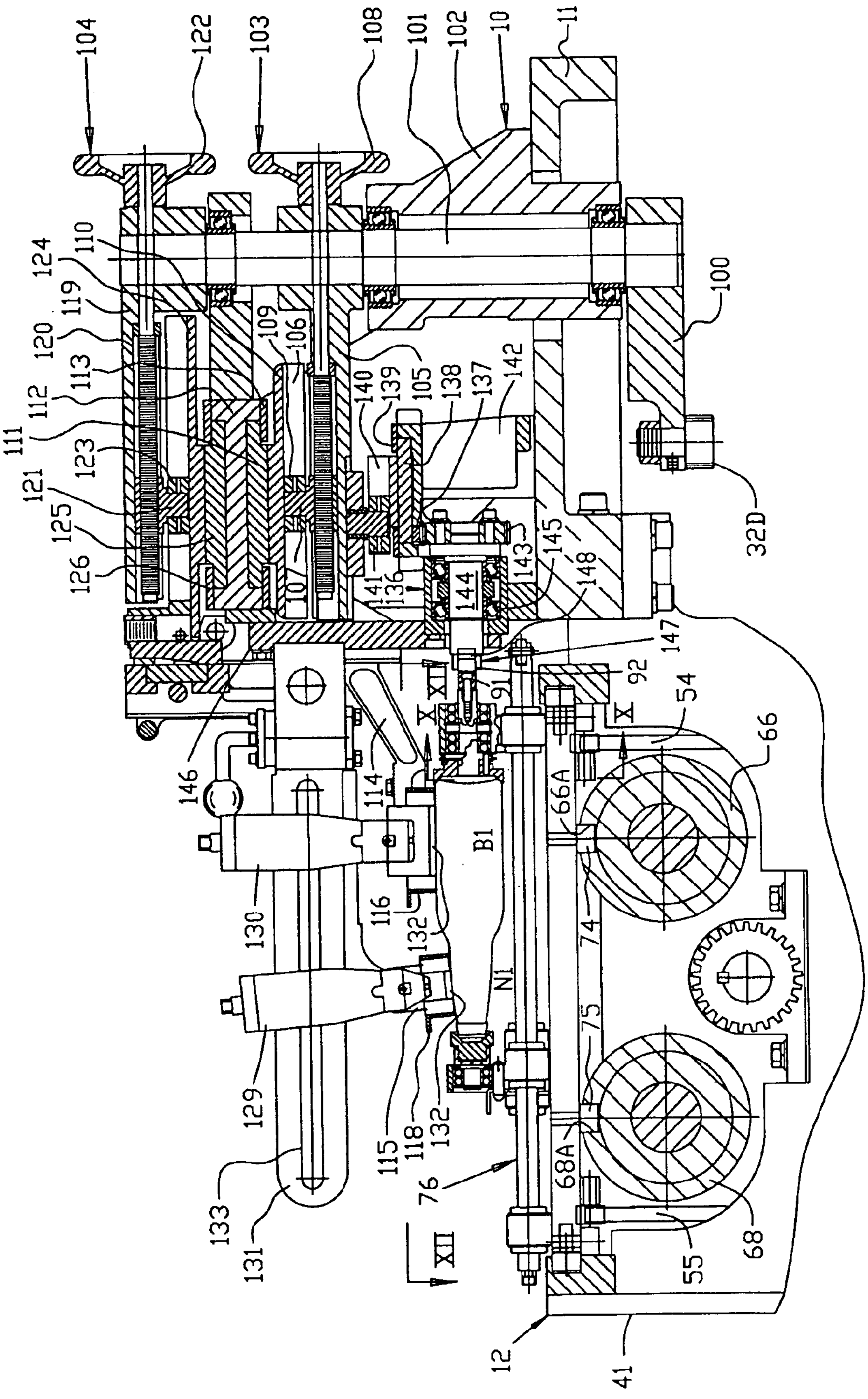
FIG. 8 is a fragmentary sectional view taken along lines VIII—VIII of FIG. 1.

At each of the decorating stations P1 and P2, the arrangement of apparatus is identical. As shown in FIGS. 3, 4 and 8, it can be seen that the gear drive 29 has its output drive shaft connected to rotate the cam 32. A cam track 32A is machined into the cam 32 and received in the cam track is a cam follower 32D. The cam follower is mounted to a lever arm. 100, which is in turn secured to the lower end of a vertical shaft 101. The shaft 101 is supported by spaced apart bearings, as shown in FIG. 8, which are in turn carried by a tubular column 102 supported by the base of the decorator machine 10. At the top of the column, 102 there are superimposed oscillation arm assemblies 103 and 104. Assembly 103 is made up of a lever arm 105 secured to shaft 101 and provided with a guideway 106 extending radially of the shaft. In the guideway there is arranged a drive bar 107, which can be moved along the guideway by the threaded portion of a hand wheel 108. The distance the drive bar 107 is located radially of the rotational axis of shaft 101 is controlled by the hand wheel 108. A drive block 109 is mounted on a portion of the drive bar 107 projecting vertically above the guideway and reciprocates in an inverted "U" shaped slot formed in a drive bar 110. The drive bar is joined to a slide 111 supported in a guideway 112. The slide is held in a slot of guideway 112 by gib plates 113. While not shown, the slide 111 protrudes laterally from opposite sides of the tubular column 102 and is provided with outwardly spaced apart receiver arms 114 and 115. The receiver arm 114 engages a decorating screen assembly 116 that is reciprocated by the linear motion of the slide 111 to thereby reciprocate the decorating screen assembly along the body portion B1 of a bottle for carrying out decorating operations thereon. Assembly 104 includes a lever arm 119 secured to shaft 101 and provided with a guideway 120 extending radially of the shaft. In the guideway there is arranged a drive bar 121, which can be moved along the guideway by the threaded portion of a feed screw operated by a hand wheel 122. The distance the drive bar 121 is located radially of the rotational axis of shaft 101 is controlled by the hand wheel 122. A drive block 123 is mounted on a portion of the drive bar 121 projecting vertically downwardly from the guideway and reciprocates in a "U" shaped slot formed in a drive bar 124. The drive bar is joined to a slide 125 supported in a guideway 112. The slide 125 is held in a slot of guideway 112 by gib plates 126. The slide 125 protrudes laterally from opposite sides of the tubular column 102, in the same manner as slide 111 protrudes. Similarly, the receiver arm 115 engages a decorating screen assembly 118 that is reciprocated by the linear motion of the slide 125 to thereby reciprocate the decorating screen assembly along the neck portion N1 of a bottle for carrying out decorating operations thereon.

Hand wheels 108 and 122 are used to select a desired stroke for the screen reciprocation to match the circumferential distance of the bottle, which is to be decorated. This matching relationship is critically significant because no relative motion between the screen movement and the bottle rotation can be accepted otherwise, smearing, or poor quality decorating will occur. As shown in FIG. 8, squeegees 129 and 130 are carried by a support arm 131 in positions above the screens 116 and 118, respectively. The squeegee construction per se is known in the art and is shown in U.S. Pat. No. 3,172,357. Each squeegee includes a squeegee rubber 132 on the end portion of squeegee positioning cylinder operated pneumatically against the force of a return spring thereby to establish line contact between the screen assembly 116 and 118 and a bottle as the bottle is rotated in a synchronous speed with linear movement of the screens. The squeegees are adjustably located by fasteners engaged in a mounting slot 133 extending along the elongated length of the support arm 131.

At each decorating station there is provided as part of the screen drives, a drive to rotate a rotator assembly 136. As shown in FIG. 8, the rotator assembly includes a drive gear 143, which is located beneath lower arm 105 where the teeth of gear 143 mesh with teeth of an elongated rack 137. Rack 137 is secured to a slide 138 arranged in a slideway supported by a pedestal 142. The slide 138 is constrained in a slideway by gibs 139 to reciprocate in response to a driving force imparted to a "U" shaped drive bar 140. The driving force is imparted by a drive block 141 mounted in a slot formed in the underside of lower arm 105. Drive block 141 serves to convert oscillating motion of lower arm 105 to linear motion of the slide thereby reciprocating the rack 137. The teeth of the rack 137 mesh with gear teeth of a drive gear 143 mounted on an end portion of an arbor 144 which is rotatably supported by a bearing 145 mounted in a bearing housing secured to a face plate 146 mounted on the base 11. A rotator drive head 147 is secured to the end portion of the arbor 144 and formed with a slotted opening 148 extending transverse to the longitudinal axis about which the arbor 144 rotates. The slotted opening receives the drive roller 92 on a bottle carrier 76 as the carrier approaches a dwell position "D" in the course of travel along the decorating machine. When the drive roller 92 is received in the opening 148, a driving relationship is established whereby rotation of the rotator head 147 rotates the drive roller 92 and the crank arm 91 for rotating the bottle 360° at the bottle decorating station.

As shown in FIG. 10, at each decorating station where a workpiece carrier is brought to a dwell period "D" interrupting its course of traveling motion there is an elongated riser section 149 representing an elevation increase to guide surfaces 98A and 98B of the guide 98. At the outboard side of the workpiece conveyor there is at each decorating station an elongated riser section, not shown, horizontally aligned with an identical elongated riser section 150 of guide 98 and representing an elevation increase to guide surfaces 99A and 99B of the guide 99 whereby each workpiece carrier arriving at a decorating station is acted upon simultaneously by a riser section at each of the opposite ends of the workpiece carrier. The riser sections elevate the bottle carrier and thus the bottle supported thereby a short distance so that the decorating screens can freely reciprocate in either direction without impingement contact with adjacent bottles.

At each of the decorating stations P1–PN the arrangement of apparatus is identical. As shown in FIGS. 3, 4 and 8, the gear drive 29 connected to rotate the cam 32 so that cam track 32A moves a cam follower 32D which is mounted to a lever arm 100 which is in turn secured to the lower end of a vertical shaft 101. The shaft 101 is supported by spaced apart bearings, as shown in FIG. 8, which are in turn carried by a tubular column 102 supported by the base of the decorator machine 10. At the top of the column, 102 there are superimposed oscillation arm assemblies 103 and 104. Assembly 103 is made up of a lever arm 105 secured to shaft 101 and provided with a guideway 106 extending radially of the shaft. In the guideway there is arranged a drive bar 107, which can be moved along the guideway by the threaded portion of a hand wheel 108. The distance the drive bar 107 is located radially of the rotational axis of shaft 101 is controlled by the hand wheel 108. A drive block 109 is mounted on a portion of the drive bar 107 projecting vertically above the guideway and reciprocates in an inverted "U" shaped slot formed in a drive bar 110. The drive bar is joined to a slide 111 supported in a guideway 112. The slide is held in a slot of guideway 112 by gib plates 113. While not shown, the slide 111 protrudes laterally from opposite sides of the tubular column 102 and is provided with outwardly spaced apart receiver arms 114 and 115. The receiver arm 114 engages a decorating screen assembly 116 that is reciprocated by the linear motion of the slide 111 to thereby reciprocate the decorating screen assembly along the body portion B1 of a bottle for carrying out decorating operations thereon. Assembly 104 includes a lever arm 119 secured to shaft 101 and provided with a guideway 120 extending radially of the shaft. In the guideway there is arranged a drive bar 121, which can be moved along the guideway by the threaded portion of a feed screw operated by a hand wheel 122. The distance the drive bar 121 is located radially of the rotational axis of shaft 101 is controlled by the hand wheel 122. A drive block 123 is mounted on a portion of the drive bar 121 projecting vertically downwardly from the guideway and reciprocates in a "U" shaped slot formed in a drive bar 124. The drive bar is joined to a slide 125 supported in a guideway 112. The slide 125 is held in a slot of guideway 112 by gib plates 126. The slide 125 protrudes laterally from opposite sides of the tubular column 102, in the same manner as slide 111 protrudes. Similarly, the receiver arm 115 engages a decorating screen assembly 118 that is reciprocated by the linear motion of the slide 125 to thereby reciprocate the decorating screen assembly along the neck portion N1 of a bottle for carrying out decorating operations thereon.

Hand wheels 108 and 122 are used to select a desired stroke for the screen reciprocation to match the circumferential distance of the bottle, which is to be decorated. This matching relationship is critically significant because no relative motion between the screen movement and the bottle rotation can be accepted otherwise, smearing, or poor quality decorating will occur. As shown in FIG. 8, squeegees 129 and 130 are carried by a support arm 131 in positions above the screens 116 and 118, respectively. Each squeegee includes a squeegee rubber 132 on the end portion of a squeegee-positioning cylinder operated pneumatically against the force of a return spring thereby to establish line contact between the screen assembly 116 and 118 and a bottle as the bottle is rotated in a synchronous speed with linear movement of the screens. The squeegees are adjustably located by fasteners engaged in a mounting slot 133 extending along the elongated length of the support arm 131.

At each decorating station there is provided as part of the screen drives, a drive to rotate a rotator assembly 136. As shown in FIG. 8, the rotator assembly includes a drive gear 143, which is located beneath lower arm 105 where the teeth of gear 143 mesh with teeth of an elongated rack 137. Rack 137 is secured to a slide 138 arranged in a slideway supported by a pedestal 142. The slide 138 is constrained in a slideway by gibs 139 to reciprocate in response to a driving force imparted to a "U" shaped drive bar 140. The driving force is imparted by a drive block 141 mounted in a slot formed in the underside of lower arm 105. Drive block 141 serves to convert oscillating motion of lower arm 105 to linear motion of the slide thereby reciprocating the rack 137. The teeth of the rack 137 mesh with gear teeth of a drive gear 143 mounted on an end portion of an arbor 144 which is rotatably supported by a bearing 145 mounted in a bearing housing secured to a face plate 146 mounted on the base 11. A rotator drive head 147 is secured to the end portion of the arbor 144 and formed with a slot opening 148 extending transversely to the longitudinal axis about which the arbor 144 rotates. The slot opening receives the drive roller 92 on a bottle carrier 76 as the carrier approaches a dwell position "D" in the course of travel along the decorating machine. When the drive roller 92 is received in the opening 148, a driving relationship is established whereby rotation of the rotator head 147 rotates the drive roller 92 and the crank arm 91 for rotating the bottle 360° at the bottle decorating station.

The continuous conveyance of the bottles as shown in FIGS. 1, 2 and 4 by the supply conveyor 24A; a bottle transfer 150; and the bottle carrier 76 occurs with the bottles arranged in a spaced relation on the supply conveyor 24A with their axes A vertically orientated and changed to horizontal orientation by operation of a bottle transfer 150 forming part of the bottle loading equipment L. The bottle transfer 150 acquires support of each bottle with its axis A in a vertical orientation on supply conveyor 24A; reorientates the bottle in a manner so that its axis A is in a horizontal orientation; and when the axis A is horizontal or substantially horizontal release or otherwise allow engagement and support for the bottle between a base cup 77 and a neck chuck 79 of a bottle carrier 76 while passing through a loading station 151. The bottle carrier remains in the driving relation between followers 95A and 95B interfitting and drivingly engaged in aligned cavities 52A and 53A, respectively, of supply disks 52 and 53 to the registration station, not shown. An example of bottle registration is to provide a dwell position for a workpiece along the conveyor 12 where before the first decorating station P1 the bottle is rotated about its longitudinal axis A by a rotator head constructed in the same manner as rotator 147 and stopped from rotation when a registration finger engaged in the registration cavity formed in the lower base portion of the bottle. When rotation of the bottle is stopped there is established a predetermined bottle orientation with respect to the decorating screens.

Figure 17:
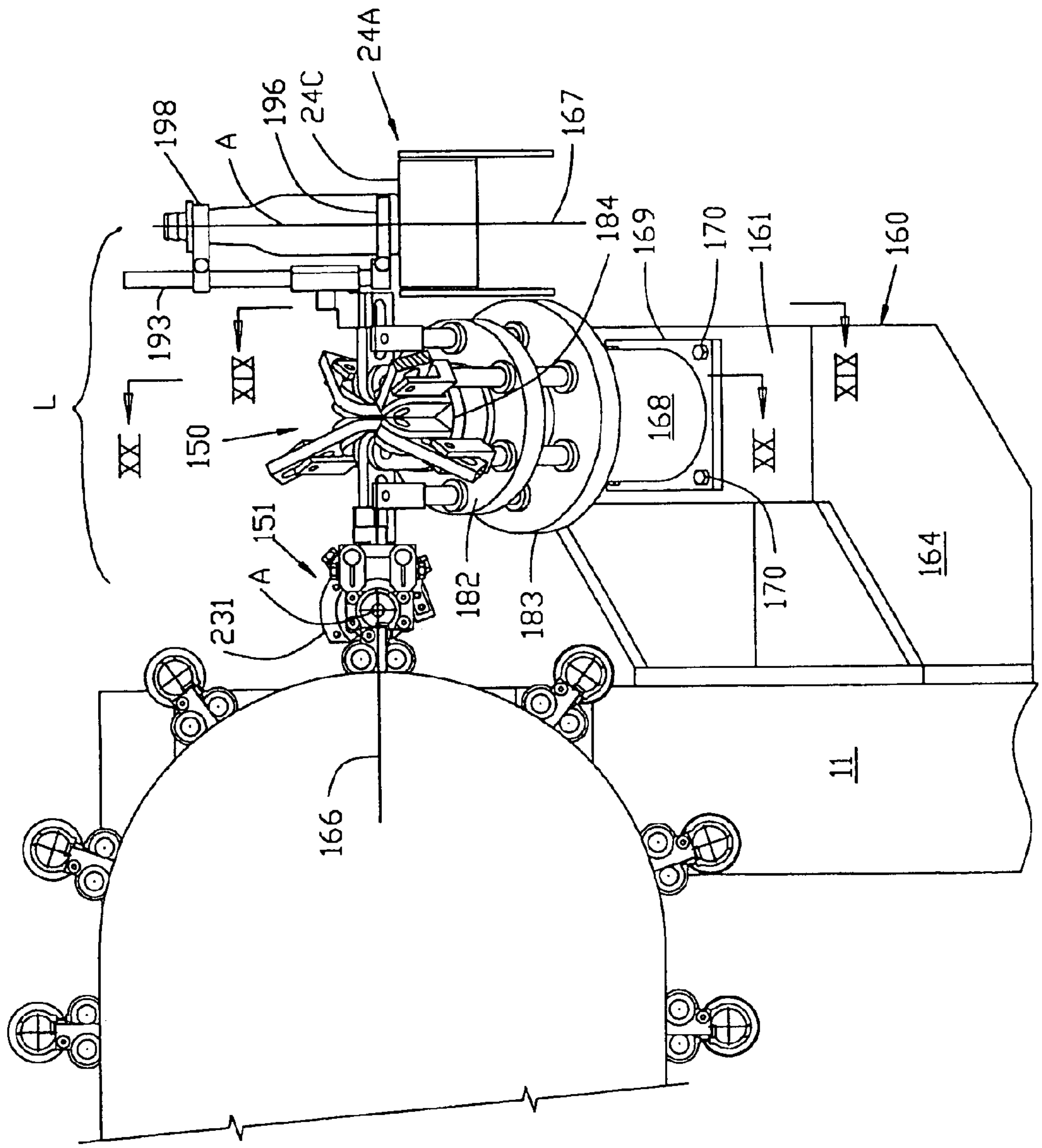
FIG. 17 is an elevational view of the bottle unloading equipment embodying the present invention.
Figure 18:
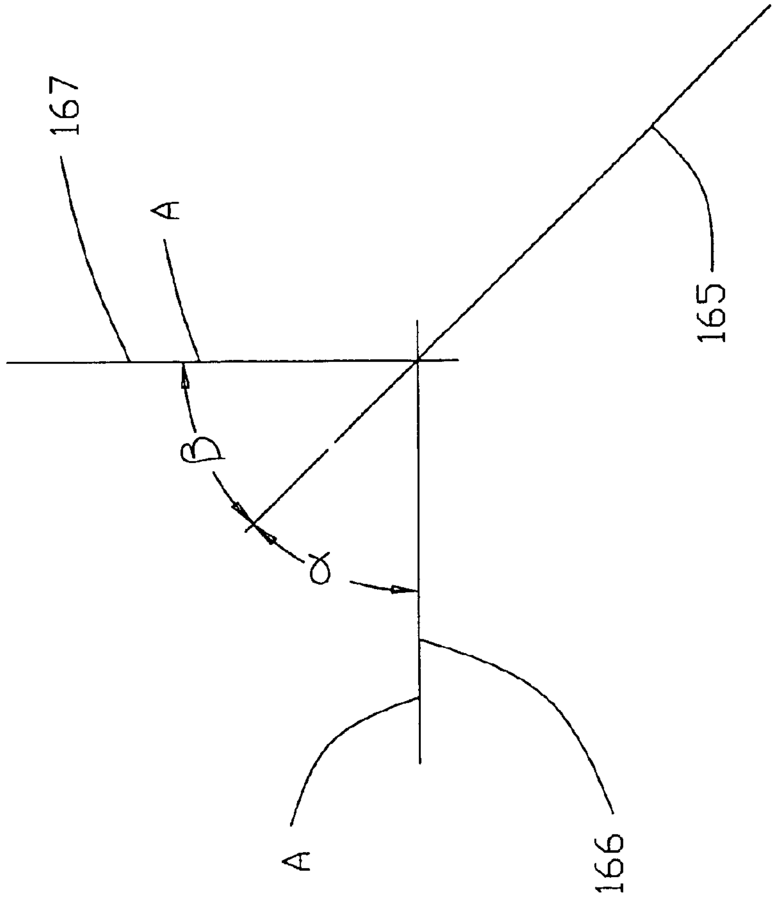
FIG. 18 is a geometric diagram illustrating the reorientation of a bottle from vertical to horizontal by operation of the loading/equipment shown in FIG. 17.
Figure 19:
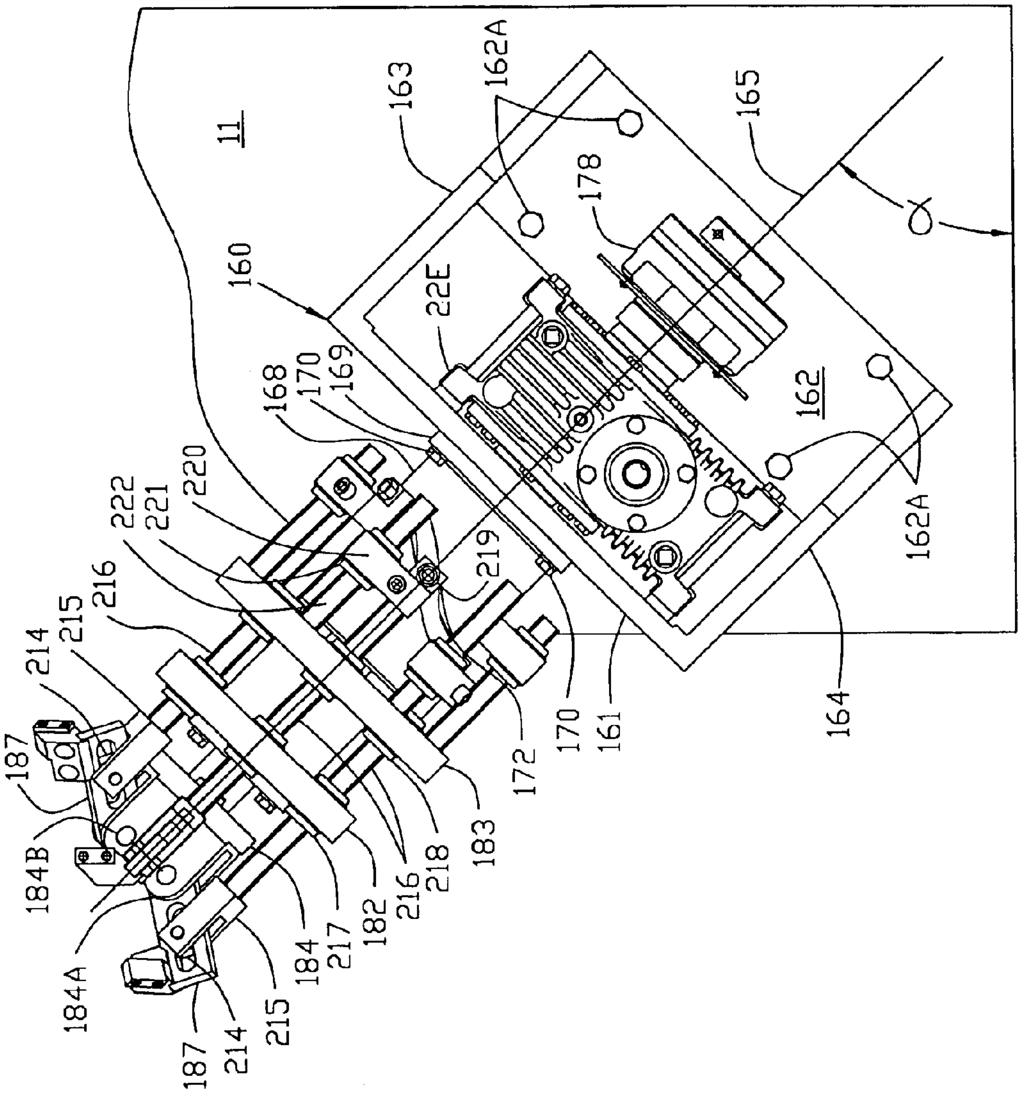
FIG. 19 is an end elevational view taken along lines XIX—XIX of FIG. 17.
Figure 20:
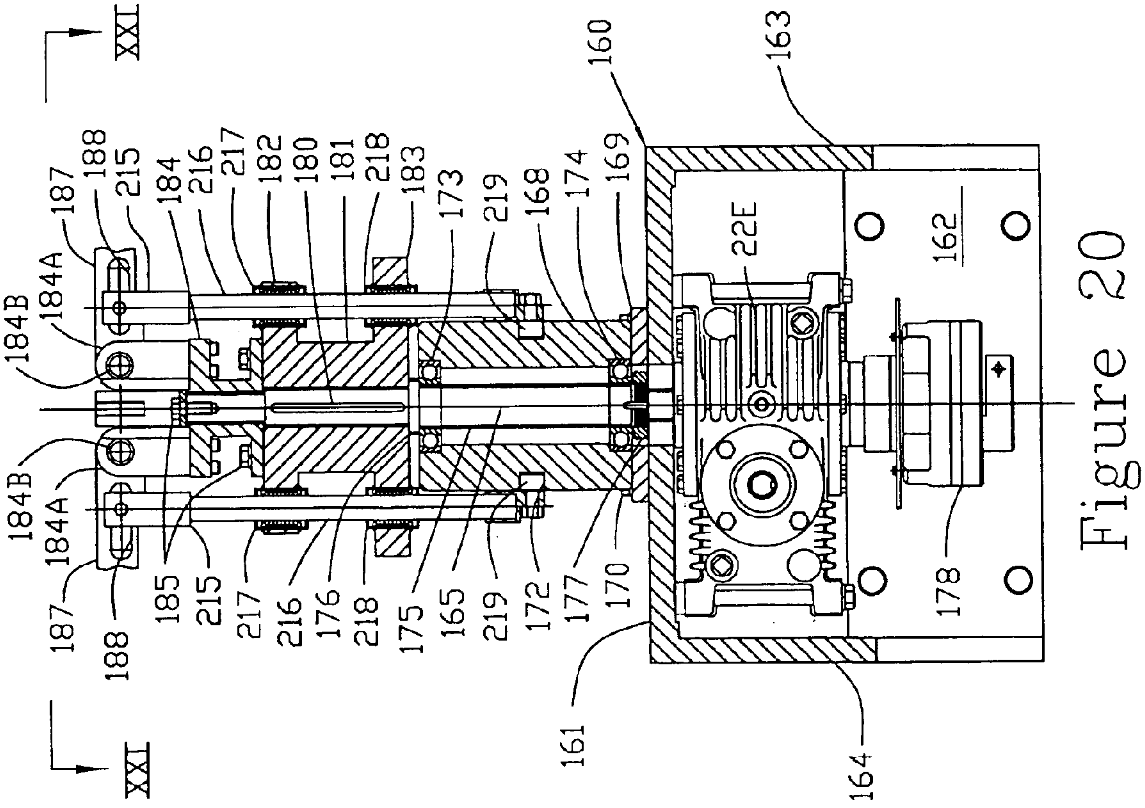
FIG. 20 is a sectional view taken along lines XX—XX of FIG. 17.

The bottle transfers 150 and 155, embodying the same construction of parts, are located at the opposite ends of the workpiece conveyor 12 for loading undecorated bottles on the horizontal bottle carriers 76 and unloading of the decorated bottles from the horizontal bottle carriers of the decorating machine. The following description of the construction of bottle transfer 150 is equally applicable to the bottle transfer 155 except as otherwise noted. As illustrated in FIGS. 17, 19 and 20, the bottle transfer 150 includes a rectangular shaped pedestal 160 having a top wall 161 with one side wall 162 joined with two end walls 163 and 164. The side wall 162 is secured by bolts 162A to the base 11 at an angular orientation for rotational operation of the bottle transfer about an angularly orientated rotational axis 165 which as shown schematically by FIG. 18 forms an acute angle $\alpha$ a with a horizontal plane 166 containing the axis A of a bottle when orientated for support by a bottle carrier 76 of the decorator conveyor 12 and forms an acute angle $\beta$ with a vertical plane 167 containing the axis A of a bottle when orientated for support by either supply conveyor 24A or delivery conveyor 24B. The angular orientation of the rotational axis 165 is an important feature of the present invention that automatically brings about a change to the orientation of the axis A of a bottle from the vertical plane 167 to the horizontal plane 166 or when desired from the horizontal plane 166 to the vertical plane 167. The acute angles $\alpha$ and $\beta$ are preferably each 45° which offers the advantage of allowing the feed and delivery conveyors 24A and 24B to extend perpendicularly to the direction of bottle movement in the decorating machine and at opposite lateral sides of the decorating machine.

Figure 21:
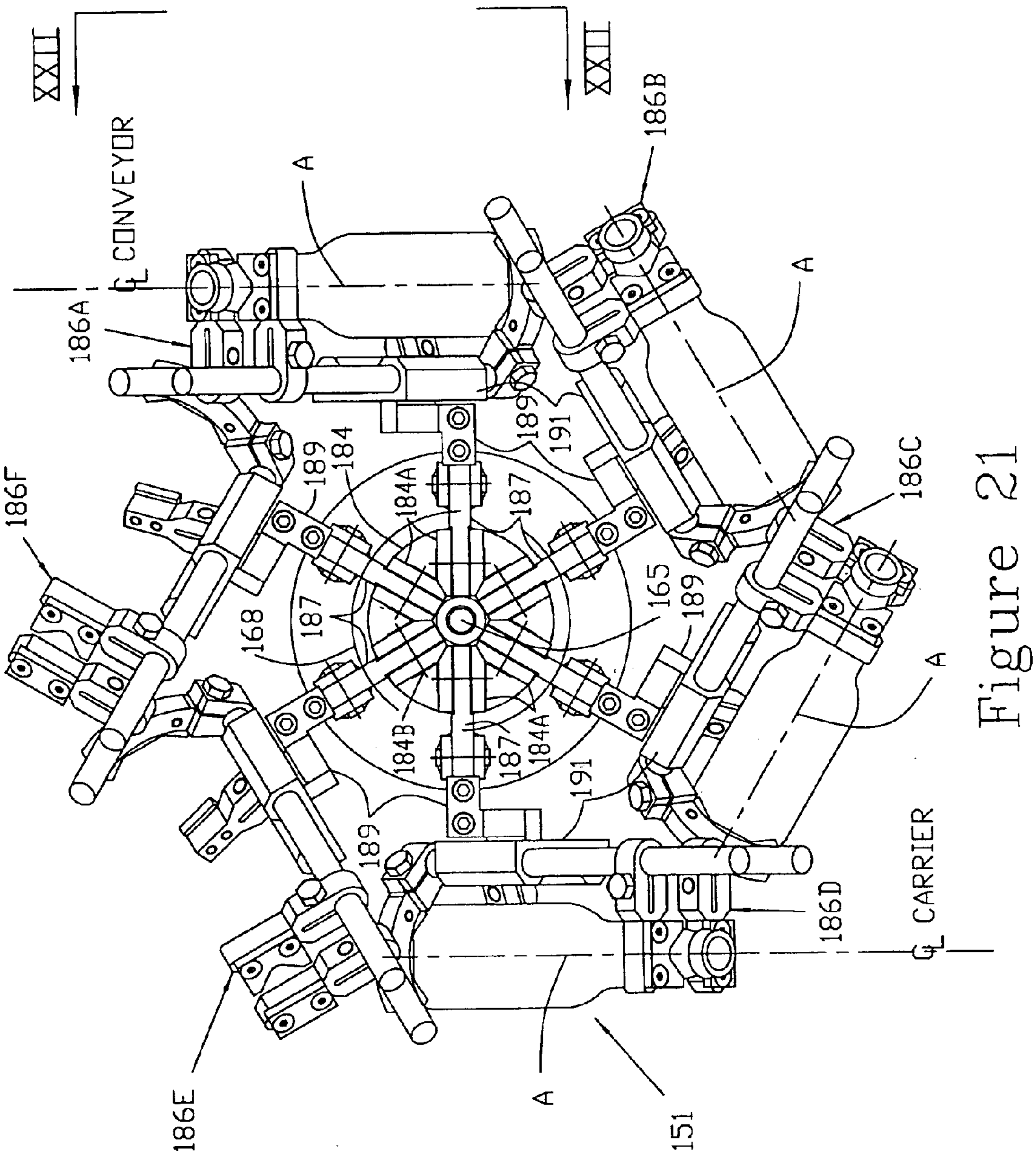
FIG. 21 is a plane view taken along lines XXI—XXI of FIG. 20.
Figures 22, 23, 24, 25:
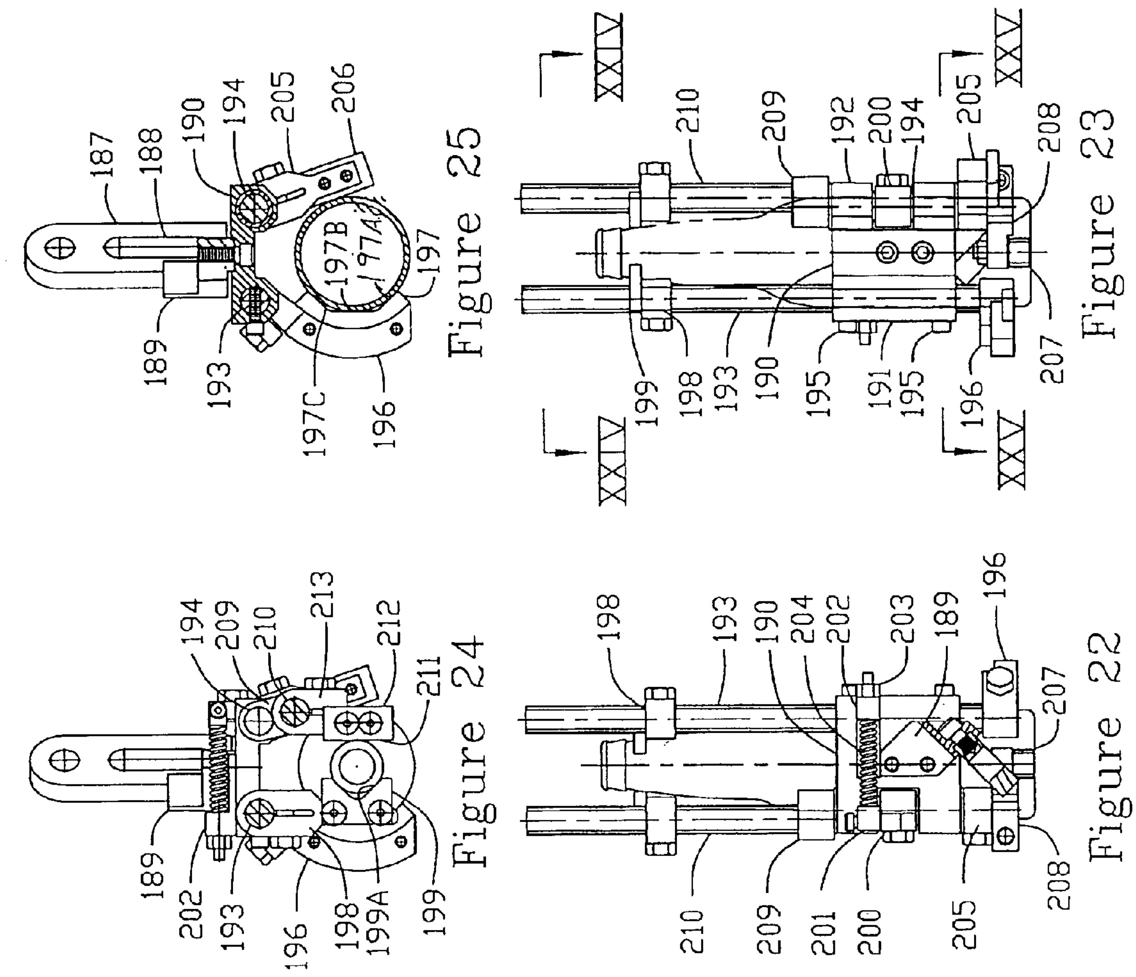
FIG. 22 is a front elevational view of a bottle gripper taken along lines XXII—XXII of FIG. 21.
FIG. 23 is a rear elevational view of the bottle gripper shown in FIG. 22.
FIG. 24 is a sectional view taken along lines XXIV—XXIV of FIG. 23.
FIG. 25 is a sectional view taken along lines XXV—XXV of FIG. 23.

The angular orientation of rotational axis 165 is established by using the top surface of top wall 161 to support a barrel cam 168 that is secured by a mounting flange 169 to the top wall 161 by the use of bolts 170. The barrel cam 168 has a closed cam track 172 and a hollow interior wherein bearings 173 and 174 are carried in spaced apart recesses and rotatably support a drive shaft 175 between a collar 176 and a threaded lock nut 177. The bearings 173 and 174 support the drive shaft 175 to rotate about an axis 165 in response to torque applied to the drive shaft through an overload clutch 178 connected to a drive output shaft of the cone worm drive 22E. The cone worm drive is supported by mounting bolts on the bottom surface of the top wall 161. As shown in FIG. 20, the drive shaft 175 includes a splined portion 180 projecting upwardly beyond collar 176 to which there is mounted a control rod carrier 181 having upper and lower flanges 182 and 183, respectively. A drive hub 184 is secured by a washer and bolt assemblies 185 to the drive shaft 175 and to the upper flange 182 of control rod carrier 181. The drive hub supports six, angularly spaced apart, bottle grippers 186A–186F (FIG. 21). It is preferred to utilize six grippers or more in pairs of grippers to reduce the rotational speed of the grippers about axis 165 between the bottle supply conveyor 24A and the workpiece conveyor 12 of the decorating machine and or the workpiece conveyor 12 and the bottle delivery conveyor 24B. Six grippers are particularly suitable for inclusion in each of the bottle loading and unloading equipment L and U where the decorating machine operates at a bottle throughput rate of 200 bottles per minute or more. The grippers 186A–186F are identically constructed and supported by angularly spaced apart upstanding clevis 184A forming part of the drive hub 184. Each clevis is secured by a pivot shaft 184B to one of carrier arms 187 for pivotal movement in discrete planes that are parallel and intersect axis 165.

Bottle gripper 186A has been identified in FIGS. 22–25 for describing the construction of each of the bottle grippers 186A–186F. The carrier arm 187 is elongated with a rectangular cross section containing a slot 188 elongated to extend in the direction of the extended length of the arm. Beyond the terminal projected end of the slot, the end of the arm 187 is secured by a mounting fixture 189 to a rectangular carriage 190 to project in opposite directions at an angle of 45° to the plane containing pivotal movement of the carrier arm 187 whereby the bottle gripper is vertically oriented at the supply conveyor 24A and horizontally orientated at the workpiece conveyor 12 while angularly rotated about axis 165. The carriage 190 is constructed with a tubular carrier section 191 extending along one lateral side opposite a bifurcated tubular carrying section 192 for supporting elongated gripper support rods 193 and 194, respectively. The gripper support rods 193 and 194 extend in a parallel and spaced apart relation with each other and with axis A of a bottle when supported by the bottle gripper. Moreover, the axis A of a bottle when supported by the bottle gripper always forms an angle of 45° to the plane containing pivotal movement of the carrier arm 187. The gripper support rod 193 is rigidly secured by setscrews 195 to the carrier section 191. On the lower terminal end portion of rod 193, there is mounted a C-shaped carrier arm 196 to which is mounted a wear-resistant insert 197 having angular surfaces 197A, 197B and 197C for engaging a hemispherical portion of the base of a bottle. The upper end of the rod 193, which is opposite the location of carrier arm 196, is secured to a carrier arm 198 provided with a wear resistant insert 199 having a V-shaped surface 199A to engage and support the neck portion of a bottle.

At the opposite side of the carriage 190, the rod 194 is pivotally supported by spaced apart bearings seated in the bifurcated parts of carrier section 192. On the lower terminal end portion of rod 194 there is rigidly mounted a pivotal carrier arm 205 provided with a wear-resistant insert 206 in an opposing relation to the C-shaped carrier arm 196. The pivotal carrier arm 205 and wear-resistant insert 206 are pivotally displaced about a rotational axis extending centrally along the length of rod 194 in response to displacement by a cam follower 207 carried by a crank arm 208 secured to a lower terminal end portion of rod 194 beneath pivotal carrier arm 205. An upper terminal end portion of rod 194 protruding from carrier section 192 is rigidly secured by a link arm 209 to the lower end of a control rod 210, which extends parallel with the extended length of rod 194 at one lateral side defined by the length of link arm 209. The pivotal carrier arm 205 and link arm 209 also serve as retainer members to maintain the rod 194 pivotally engaged by the carrier section 192. The link arm 209 forms part of a geometric link for imparting pivotal movement by rod 194 to a generally planar support face 211 of a wear-resistant insert 212 on pivotal carrier arm 213 to engage and form a supporting relation for a neck portion of a bottle with the V-shaped surfaces 199A of support arm 198. The pivotal movement of pivotal carrier arms 205 and 213 are biased in a direction for maintaining supporting engagement with a bottle the force for this bias is provided by using the attachment block 200 as a mounting structure for a control rod 201 having a threaded end portion extending through an aperture in a support lug 202 on carriage 190. The threaded end portion of rod 201 is engaged with a lock nut 203 that is adjustably positioned along the threaded end portion to apply a compressive force of a helical spring 204 surrounding the control rod 201 as the biasing force to pivotal carrier arms 205 and 213 when engaged with the bottle.

Referring again to FIGS. 19 and 20, the slot 188 in each of the carrier arms 187 of the grippers 186A–186F receives a slide bar 214 connected by a pivot to a clevis 215 on an upper end of an actuating rod 216 which is slidably supported by linear bearings 217 and 218 carried by each of the upper flange 182 and lower flange 183 respectively of the central rod carrier 181. The lower end of the actuating rod 216 is secured to a cam follower 219 residing in the closed cam track 172 of barrel cam 168. The course of travel by the cam follower 219 along the cam track 172 produces a literal reciprocating motion by the actuating rod 216 in a timed relation with rotation of the bottle gripper about the rotational axis 165. A control arm 220 is secured to the actuating rod 216 immediately above the site of cam follower 219 and carries a linear bearing 221 to guide the control arm 220 to reciprocate along a guide rod 222 supported by and extending downwardly from lower flange 183 and thereby prevent unwanted rotational movement of the actuating rod 216 about its axis extending in the direction of its extended length.

Figure 26:
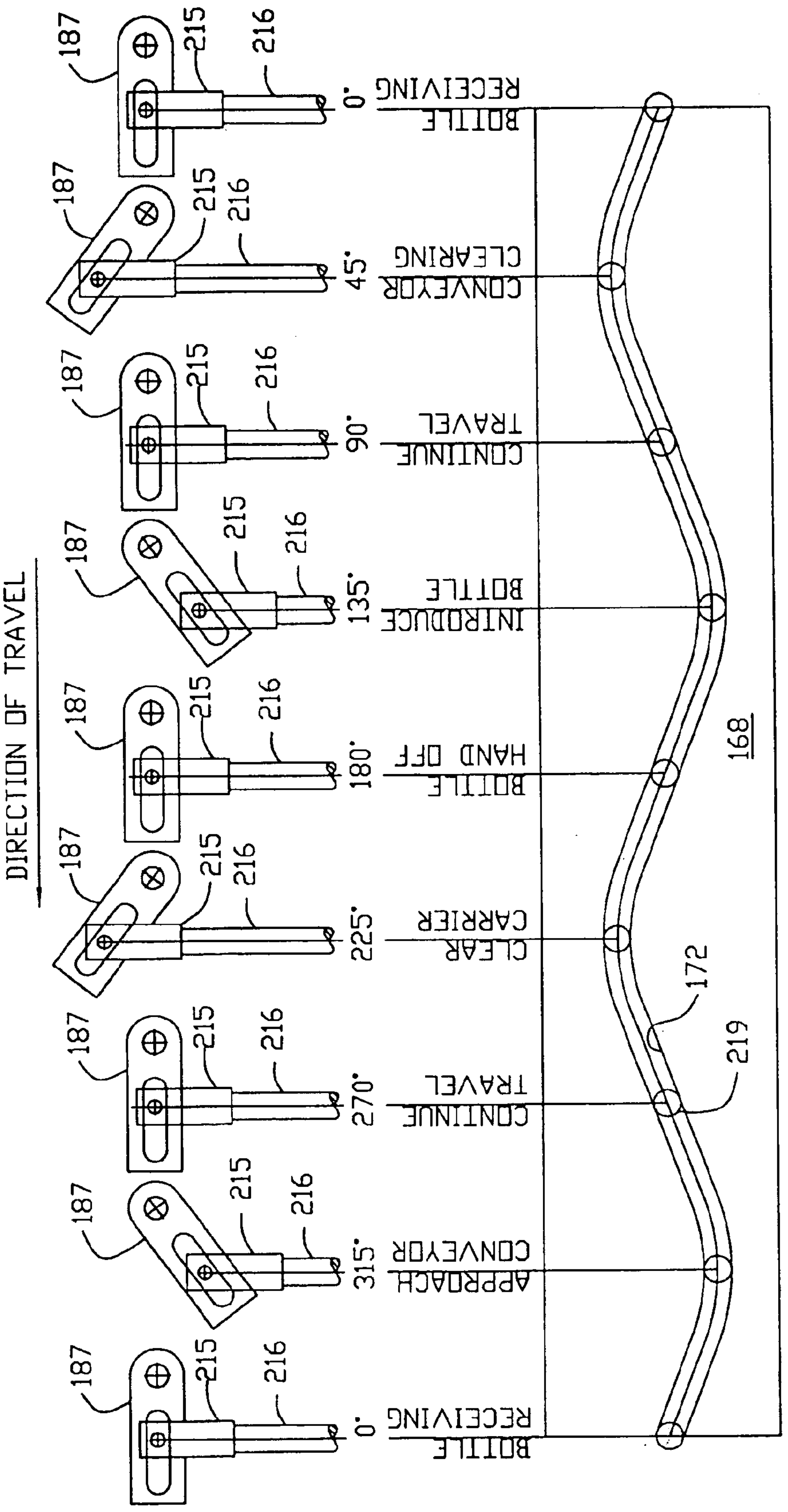
FIG. 26 diagrammatical illustrates the pivotal displacement of a bottle gripper by a cam drive.
Figure 29:
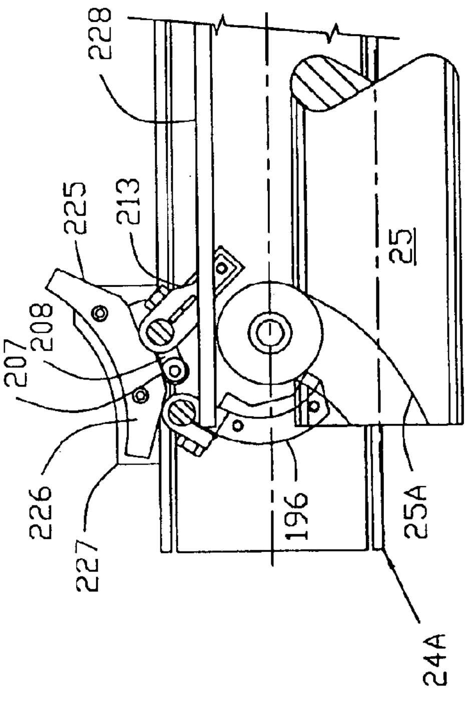
Figure 30:
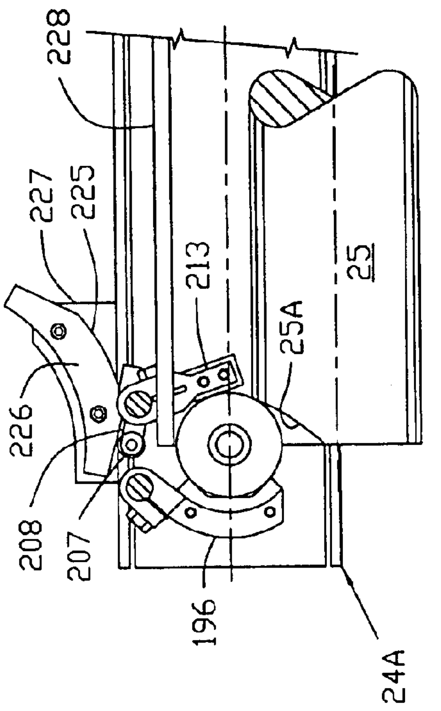

FIG. 26 diagrammatically illustrates the reciprocal movement of a gripper support arm 187 of gripper 186A which is the same as each cam follower 219 of the gripper support arms 187 proceeds along the same cam track172 of the barrel cam 168. A BOTTLE RECEIVING position is identified by a 0° designation point on the barrel cam track 172 and established in the transfer cycle by the relation of the gripper support arm 187 extending at a horizontal position and midway between extreme upward and downward positions. In the BOTTLE RECEIVING position, the arm 187 extends in a horizontal plane that is perpendicular to the axis A of a bottle while supported on the supply conveyor 24A. The pivotal carrier arms 205 and 213 assume supporting engagement with a bottle when the cam follower 207 ceases contact with an arcuate cam surface 225 of a C-shaped cam 226 as shown in FIG. 30. The cam 226 is mounted on a shelf 227 extending horizontally at one lateral side of the conveyor 24A in the direction toward the bottle transfer 150. Immediately prior to the supporting engagement between the bottle and pivotal carrier arms 205 and 213, as shown in FIG. 29, the follower 207 advances along cam surface 225 which operates to maintain pivotal carrier arms 205 and 213 pivotally displaced outwardly in a direction away from the V-shaped surface 1 99A and the angular surfaces 197A, 197B and 197C, respectively. The delivery of a bottle to the site where supporting engagement is established with one of the bottle grippers 186A–186F is in a timed relation between advancing movement of a bottle by the conveyor 24A and the movement of a gripper to a vertical orientation by passing through a zone where a bottle is engaged and supported by the gripper. When alternative forms of supply and delivery conveyors extend along a lateral side or above the conveyance, paths for the bottles such as described hereinbefore, the reciprocating motion imparted to the bottle grippers 186A–186F of the carrier arms 187 will facilitate the receiving and delivery of bottles with such alternative forms of supply and delivery conveyors.

Figure 27:
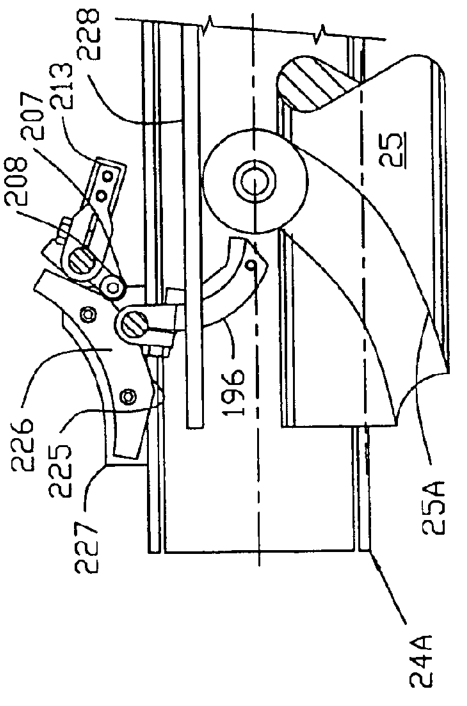
FIGS. 27–30 are illustrations of the sequence of the transfer of support of a bottle from a supply conveyor to a bottle transfer according to the present invention.
Figure 28:
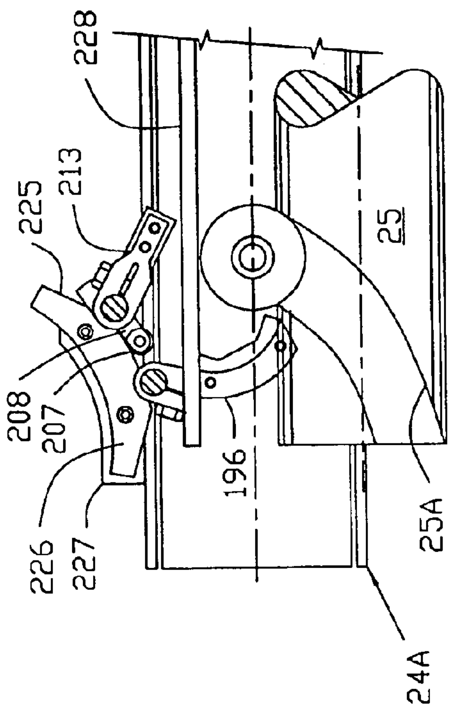

As shown in FIG. 27, the bottles are advanced along a horizontal guide rail 228 by the conveyor 24A initially with the bottles in an abutting relation until engagement is established with the timing screw 25 whereupon the helical groove 25A having an ever increasing pitch in the direction of advancing movement by the conveyor establishes a correspondingly ever increasing space between the bottles. The pivotal carrier arm 213 and C-shaped carrier arm 196 are shown in FIGS. 27–30, in their generally horizontal path of travel at the end portion of the timing screw. In FIG. 28, there is illustrated the carrier arm 196 advanced above the conveyor beyond the bottle undergoing restrained advancing movement by the timing screw and held captive by the timing screw and the guide rail 228. The pivotal carrier arm 213 resides at a lateral side of the conveyor while the cam follower 207 which is coupled by the pivot arm 208 to gripper support rod 194 approaches cam surface 225 of the C-shaped cam 226. In FIG. 29, the timing screw allows continued advancing movement of the bottle while the carrier arm 196 moves toward a central position along the conveyor 24A ahead of the bottle and the pivotal carrier arm 213 undergoes pivotal movement by engagement by the cam follower 207 with cam surface 225. Pivotal carrier arm 213 now trails the bottle at a location above the conveyor. In FIG. 29, the carrier arm 196 advances along the conveyor with pivotal motion that operates to orient angular surfaces 197A, 197B, and 197C into a proximal confronting relation with the advancing bottle while still restrained by the timing screw. The relative movement between the carrier arm 196 and the bottle continues the advancing movement of the bottle toward the carrier arm as the follower 207 nears the trailing end portion of the cam surface 225 which serves to initiate pivotal movement of the pivotal carrier arm 213 toward the side of the bottle generally opposite the side of the carrier arm 196. As the cam follower, 207 moves out of contact with cam surface 225, pivotal carrier arm 213 pivots into contact with the bottle. FIG. 30 illustrates the moment of release of a bottle from the timing screw and the simultaneous establishment of supporting engagement between carrier arm 196 and pivotal carrier arm 213 that is the BOTTLE RECEIVING position identified as a 0° designation point on the barrel cam track 172 forming part of the transfer cycle in FIG. 26.

As shown in FIG. 1 there is a segment of travel by a bottle gripper across a substantially vertical orientation zone 230 characterized by advancing movement of the bottle gripper in a substantially vertical orientation before and after the moment the bottle gripper engages the bottle with the axis A vertically orientated. As shown in FIG. 26 the CONVEYOR CLEARING segment of travel is part of a zone 230 where the axis A of a bottle remains substantially vertical and is produced as the cam follower 219 of a bottle gripper travels 4 along cam track 172 from 0° to 45° which maintains the gripper in a substantially vertical orientation and with advancing substantially horizontal movement across the terminal end portion of the conveyor 24A. Another part of the zone 230 is an APPROACH CONVEYOR segment occurring along can track 172 at about 45° prior to 0° by the bottle gripper movements causing a substantially vertical orientation of the bottle gripper before the moment when a bottle is engaged by the bottle gripper. The APPROACH CONVEYOR segment and the CONVEYOR CLEARING segment form the entire substantially vertical orientation zone 230. This course of travel by the bottle gripper is the result of rotary movement of the gripper about axis 165 and a pivotal displacement of the gripper by rod 216 in a vertically upward direction by the follower 219 movement along cam track 172. The bottle gripper enters the CONVEYOR ENTRY segment in a substantially vertical orientation due to the same rotary movement combined with the vertically downward movement produced by pivotal displacement of the gripper by rod 216 in a vertically downward direction by the follower 219 along cam track 172.

From 45° through 90° to 135° the bottle gripper is pivoted downwardly and then from 135° through 180° to 225° a bottle on the gripper is pivoted upwardly. These upward and downward pivotal motions of the gripper occur simultaneously with the rotary motion of the gripper about axis 165. The combined effect is a reorientation of the gripper whereby the axis A of a bottle supported by the gripper is changed from generally vertical orientation to a generally horizontal orientation. The reorientation is beneficially enhanced by the action produced by cam track 172 by providing that the bottle carrier moves across the bottle supply conveyor 24A with a continuous motion characterized by substantially matched speed and direction. This feature of the present invention enables the transfer of support for a bottle from the supply conveyor to the bottle gripper while the bottle remains in a stable orientation without a significant change to the take off speed by the bottle from the conveyor. In a similar fashion, the combined continuous motions of the bottle carrier approaching the 180° point along the cam track produce an approach by the bottle toward a horizontal bottle carrier 76 in a substantially horizontal orientation zone indicated by reference numeral 231 in FIG. 2. In the horizontal path the movement by bottle carrier slows to a stable horizontal orientation without a significant speed difference with the bottle carrier speed. At 180° the bottle is handed off for support by the decorator conveyor. The pivotal positioning of the gripper by operation of cam track 172 from 225° through 270° to 315° reorientates the bottle gripper for approach to the supply conveyor 24A along a substantially horizontal path of travel as indicated by reference numeral 231 in FIG. 2.

Figure 32:
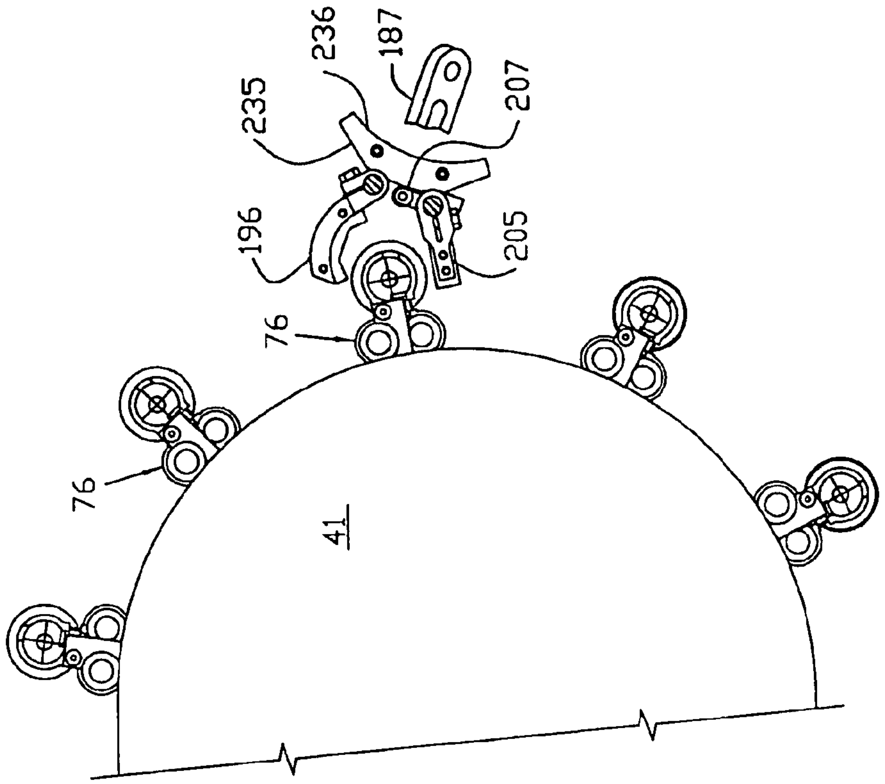
FIGS. 31 and 32 are elevational views to illustrate the transfer of a bottle from the bottle transfer to the workpiece conveyor.
Figure 31:
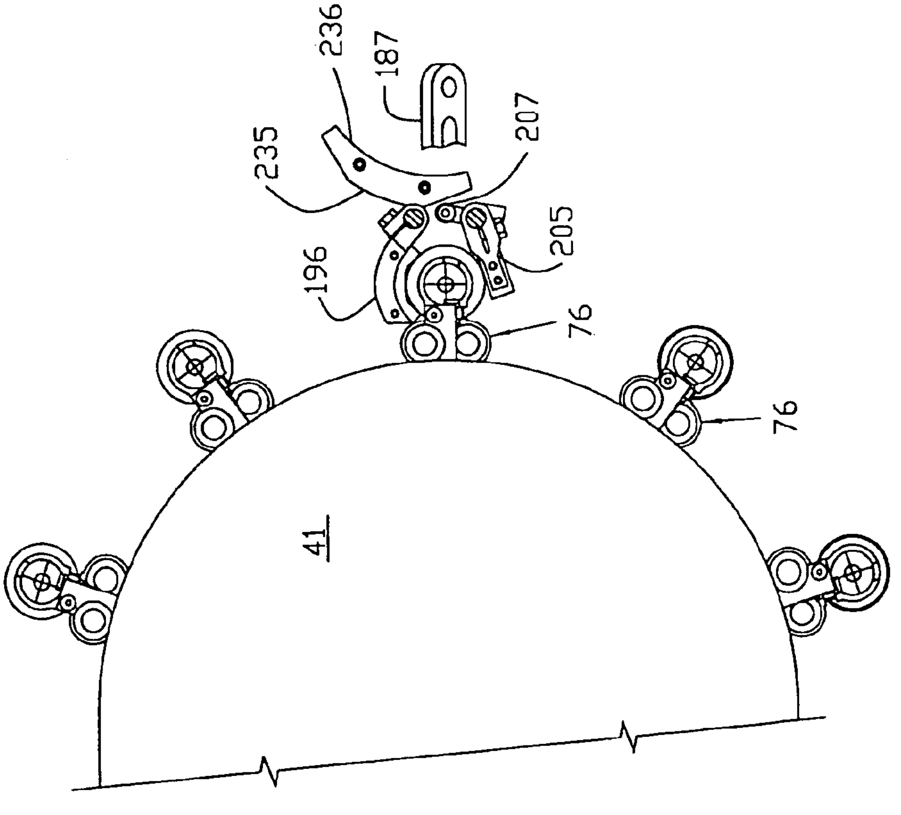

Concurrently with the passage of the bottle along the substantially horizontal path of travel 231, there is an increase to the preset separation distance between the base cup 77 and mouthpiece 78 of a horizontal bottle carrier 76 by displacement of the actuator shaft 80 (FIGS. 12A and 12B) in response to contact between the actuator cam follower 80A and cam 85 as previously described as shown in FIGS. 2 and 7. As the mouthpiece 78 moves to clamp the bottle between the mouthpiece and the base cup in response to passage of the follower 80A beyond cam 85, the pivotal carrier arms 205 and 213 are displaced from supporting engagement with a bottle by contact of the cam follower 207 with an arcuate cam surface 235 of a C-shaped cam 236 as shown in FIGS. 31 and 32. The cam 236 is secured by a bracket to the base 11 of the decorating machine to strategically reside in the pathway of cam follower 207. As seen in FIG. 32 the cam surface 235 is engaged by the cam follower 207 when or at least immediately after the bottle is engaged and supported between the base cup 77 and mouthpiece 78 of a horizontal bottle carrier 76. The transfer of support occurs when the axis A of the bottle is horizontal and residing in horizontal plane 166 and thus completing the change to the reorientation of the bottle as shown in FIG. 18 from the vertical where the axis A is coextensive the vertical plane 167 to the horizontal where the axis A is coextensive with the horizontal plane 166. As the bottle is transported by the carrier 76, the pivotal carrier arms 205 and 213, as shown in FIG. 32 are maintained pivotally displaced outwardly in a direction away from their respective V-shaped surface 199A and angular surfaces 197A, 197B and 197C and thereby avoid interference with the moving carrier 76 and bottle supported thereby.

Figure 33:
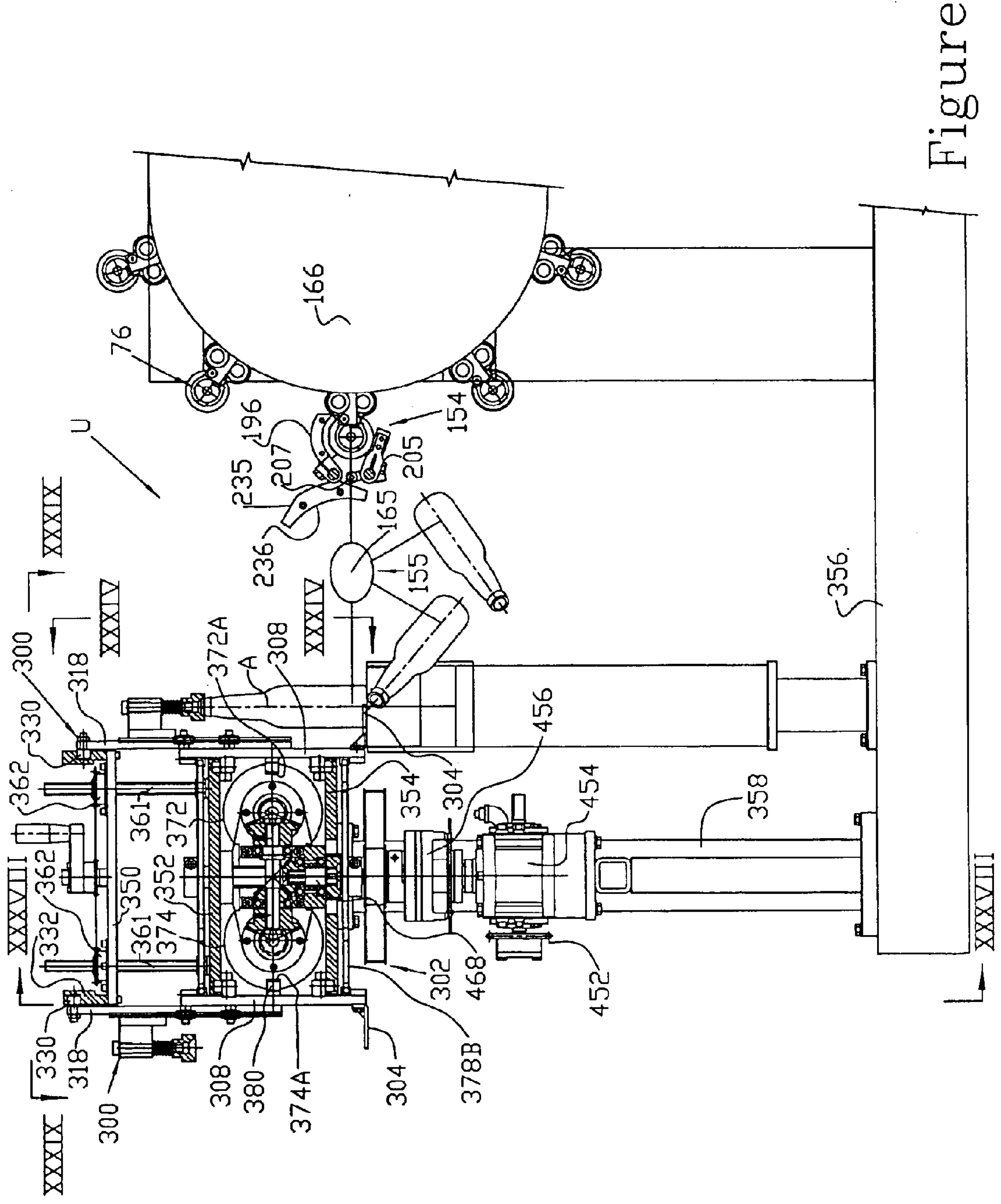
FIG. 33 is an elevational view similar to FIG. 31 and illustrating the transfer of a bottle from the workpiece conveyor to a bottle steady apparatus of the present invention.
Figure 33A:
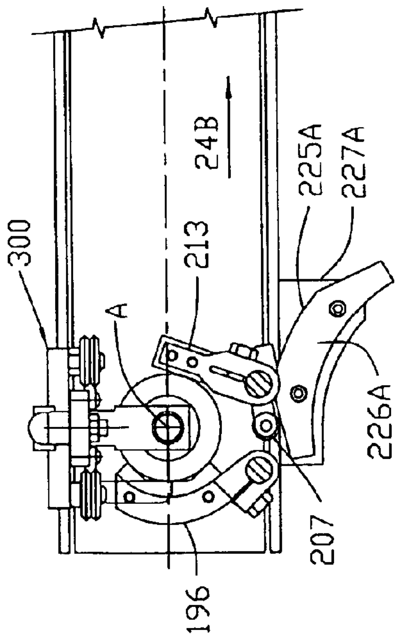
FIGS. 33A, 33B, 33C, and 33D are illustrations of the sequence of the transfer support of a bottle from a bottle transfer to the bottle steady apparatus of the present invention;.
Figure 33B:
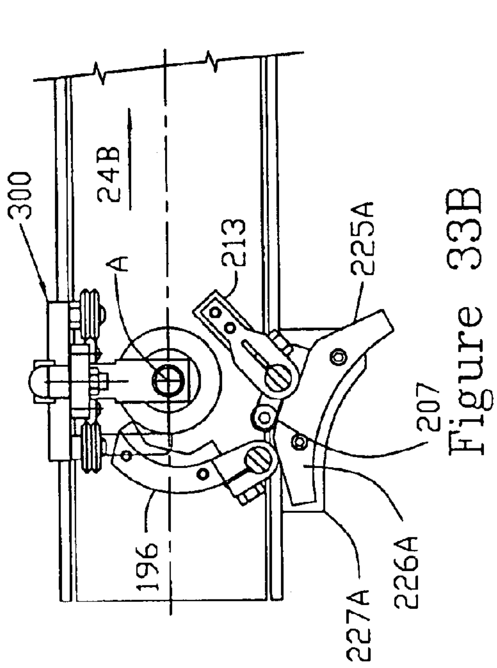
Figure 33C:
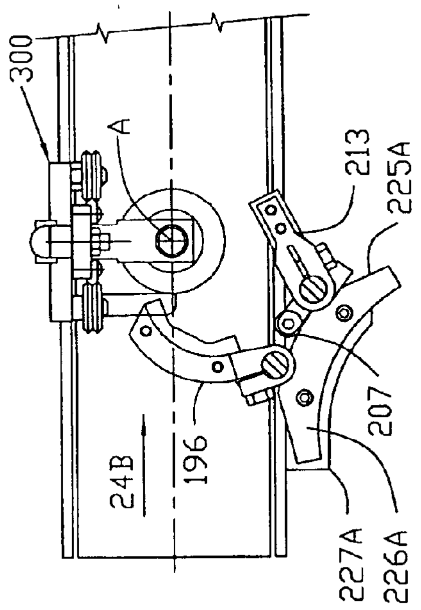
Figure 33D:
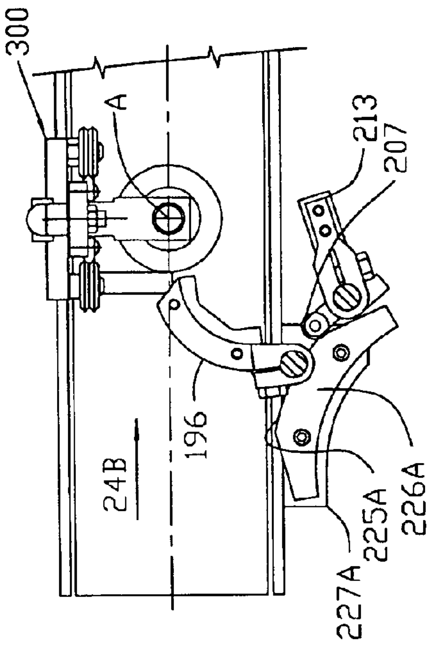

Referring now to FIG. 33, the bottle transfer 155 at the bottle unloading equipment U utilizes the cam 236 with cam surface 235 oriented in the manner of an opposite hand arrangement to that shown and described in regard to FIGS. 31 and 32. This opposite hand arrangement is characterized by a positioning of the cam 236 along the path of travel by a bottle carrier 76 at a site located before the bottle unloading station 154 which is to be compared with the positioning of cam 236 in the same manner along the path of travel by a horizontal bottle carrier at a site located before passage to the bottle loading station 154. At the bottle unloading station 154, the cam 236 has functioned to pivotally displace the pivotal carrier arms 205 and 213 in a direction away from the C-shaped carrier arm grippers 196 and the carrier arm 198 before the horizontal bottle carrier 76 arrives at the unloading station. The and grippers pass along opposite sides of a bottle while supported by a bottle carrier 76 approaching the bottle unloading station 154. Cam 86 operates to release the bottle at the unloading station at substantially the same time as cam follower 207 passes downwardly beyond cam surface 235 causing the pivotal carrier arms 205 and 213 to assume a supporting engagement with the bottle. The cam 226A supported by the shelf 227A along the side of delivery conveyor 24B operates to move the pivotal carrier arms 205 and 213 in a direction to release a bottle from support by the bottle transfer and conveyance by conveyor 24B. The release of the bottle by the bottle transfer for conveyance by delivery conveyor 24B occurs by the operating position of the cam surface 225A of cam 226A at the side of the conveyor to engage the follower 207 when the central axis A of a bottle is centrally disposed with respect to the width of the conveyor. The follower 207 pivots the carrier arm 205 and 213 forwardly in the direction away from the bottle and the gripper 196 is rotated by the bottle transfer away from the bottle as seen by the illustration of FIGS. 33A and 33B. A vertical bottle carrier 300 of a bottle steady apparatus 302 establishes supporting engagement with the bottle by the time the baffle is released from the bottle transfer. FIGS. 33C and 33D illustrates two sequential separations between the bottle as advanced by the vertical carrier and the departing bottle transfer. The bottle is advanced linearly in the direction of conveyer 24B which displaces the bottle beyond the rotary path of travel by the bottle transfer. The bottle steady apparatus 302 is provided according to the present invention to reduce the spacing between consecutive bottles delivered from the decorating machine by the bottle transfer and the apparatus is particularly useful to reduce the linear advancement speed that is necessary to accommodate a bottle-decorating rate of, for example, 200, or more bottles per minute. It will be understood by those skilled in the art that the moment of inertia acting on each bottle is centered about axis 165 of the bottle transfer at the arrival site on the delivery conveyor and therefore is non-linear at the release site on the delivery conveyor 24A with respect to the direction of movement by the conveyor. The bottle steady apparatus 302 serves the additional function of dissipating the destabilizing forces acting on the bottle on the conveyor, which destabilizing forces can be very detrimental when the bottle unloading operations occur with continuous motion and capable of relatively high bottle throughput operating speed.

Figure 40:
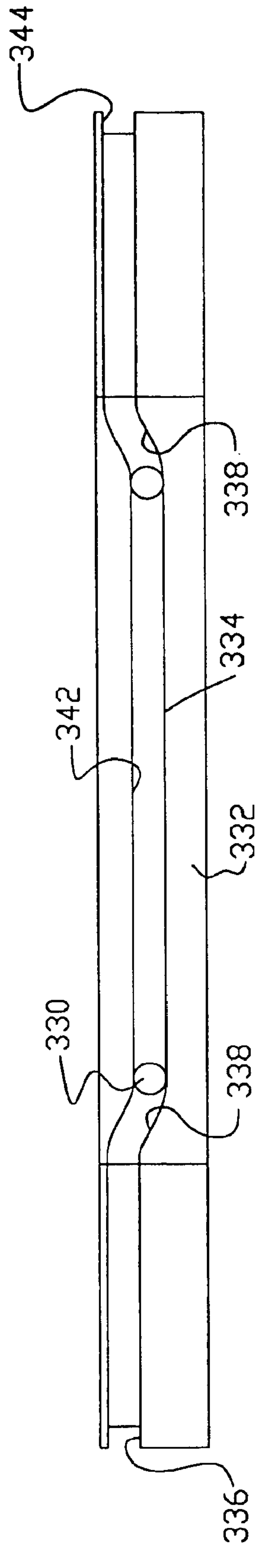
FIG. 40 is an elevational view taken along lines XXXX—XXXX of FIG. 39.

FIGS. 33–36 illustrate the details of the construction of the vertical bottle steady carriers 300. Each carrier essentially includes a pusher arm 304 with a mounting arm secured by a bolt to a vertically arranged base plate 308 at a location so that the pusher arm can engage the lower base of a bottle at a site between the conveyer and gripper 196 when present. Pairs of upper and lower guide rollers 310 and 312 are mounted by bolts 314 to the base 308 at outwardly spaced locations from the face surface of the base plate 308 by spacer sleeves 316. A slide plate 318 carries parallel guide bars 320 having V-shaped edges protruding beyond the side edges of the slide plate and engaged within corresponding-shaped groves in the face surfaces of the rollers 310 and 312. The arrangement of parts is such that the plate moves vertically downward to displace a vertically biased mouthpiece 322 by a spring and slide rod mounted on the slide plate in supporting engagement with a bottle. As shown, the mouthpiece 322 is provided with a shallow protruding bevel edge 324 to receive and center the mouth of a bottle in the mouthpiece whereby the upper portion of the bottle is restrained and driven linearly by the vertical bottle carrier. The mouthpiece 322 is slidably supported on one leg of an L-shaped arm 326 secured by bolts 328 to the slide plate 318 between the guide bars 320. The mouthpiece 322 is lowered into a engagement with the mouth of a bottle while the bottom of the bottle is seated onto a conveyer by a follower roller 330 mounted to the face surface of a slide plate 318 opposite to the guide bars 320. As shown in FIG. 40, the follower roller 330 passes along an oval shaped cam 332 having a linear cam surface 334 located in a lower plane of two planes established to position the mouthpiece 322 in supporting engagement with the mouth of a bottle. A linear cam surface 336 located in the upper of the two planes establishes an inoperative location for the mouth piece 322 wherein the mouth piece is advance along the cam track at a elevation above the mouth of the bottle. The linear cam surfaces 334 and 336 are joined by transitional cam segments 338 wherein the follower roller moves between the two planes and thereby moves into and out of engagement with the mouth of the bottle. The bottle steady apparatus 302 further includes an oval shaped cam carrier plate 350, an oval shaped upper housing plate 352, and an oval shaped lower housing plate 354. Extending from a base plate 356 is a support pedestal 358 provided with a flange for securing the pedestal at the central portion of the oval shaped lower housing plate 354. Three spacer columns 360 are used to rigidly secure the oval shaped lower housing plate 354 to the oval shaped upper housing plate 352. The upper oval shaped housing plate 352 rigidly supports an array of four upstanding and threaded spindles 361 that extend through apertures in the oval shaped cam carrier plate 350 and into threaded engagement with a corresponding array of four drive nut assemblies 362 (FIG. 38) that are flange mounted to the upper surface of the oval shaped cam carrier plate 350. Each of the drive nut assemblies includes a sprocket 364 coupled by an endless chain 366 that is also coupled with a drive sprocket 368. The drive sprocket is secured to a vertical drive shaft rotatably supported by a flanged mounting on the oval shaped cam carrier plate. The drive shaft is joined with a crank arm 370 which is rotated to simultaneously rotate the four drive nut assembly 362 and thereby alter the elevation of the oval shaped cam carrier plate 350 and the cam 332 supported thereon to accommodate a particular height of a bottle between the conveyor and mouthpiece.

Figure 36:
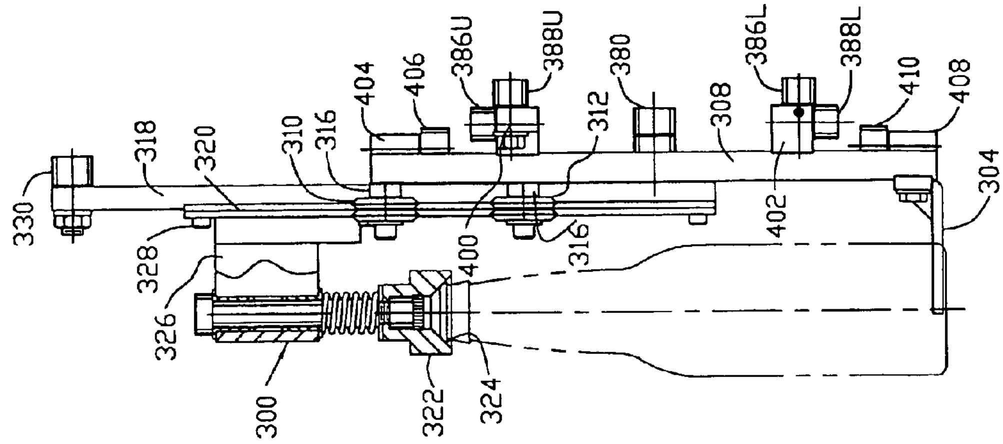
FIG. 36 is a sectional view taken along lines XXXVI—XXXVI of FIG. 34.
Figure 34:
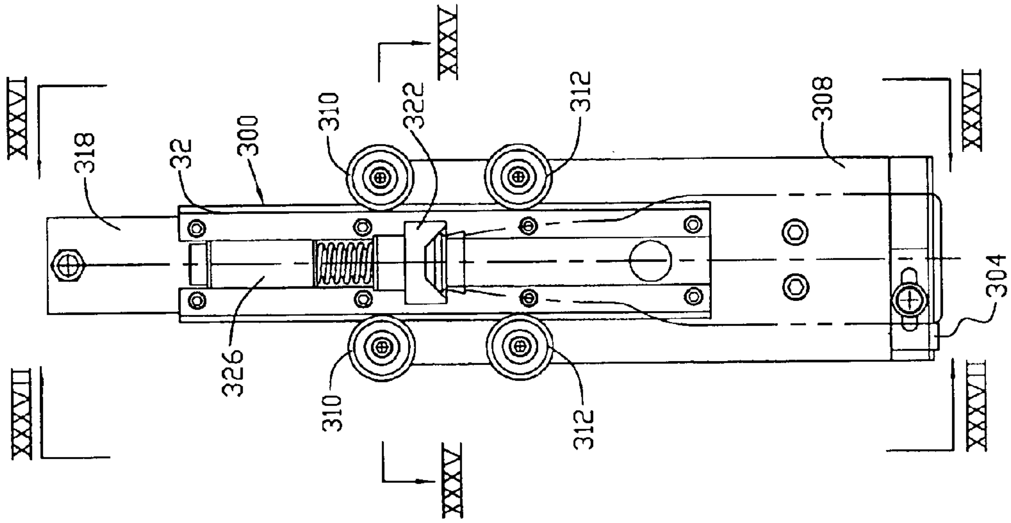
FIG. 34 is a front elevational view of a vertical bottle carrier forming part of the bottle steady apparatus of the present invention.
Figure 37:
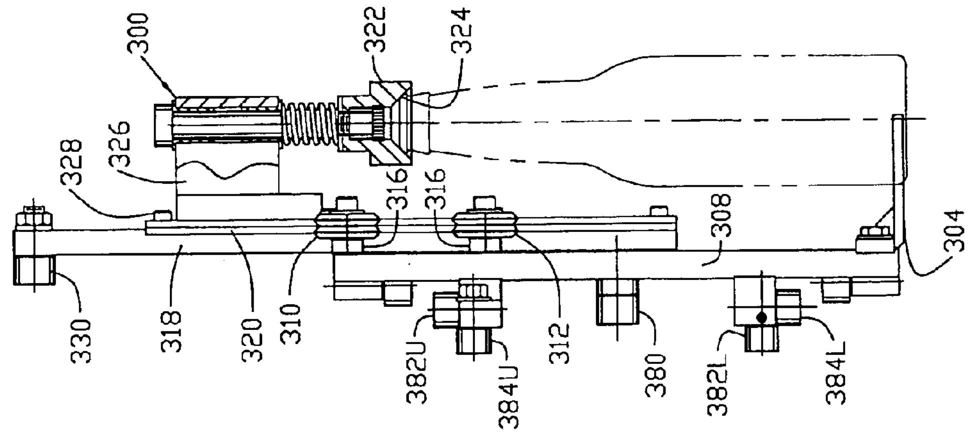
FIG. 37 is a sectional view taken along lines XXXVII—XXXVII of FIG. 34.
Figure 35:
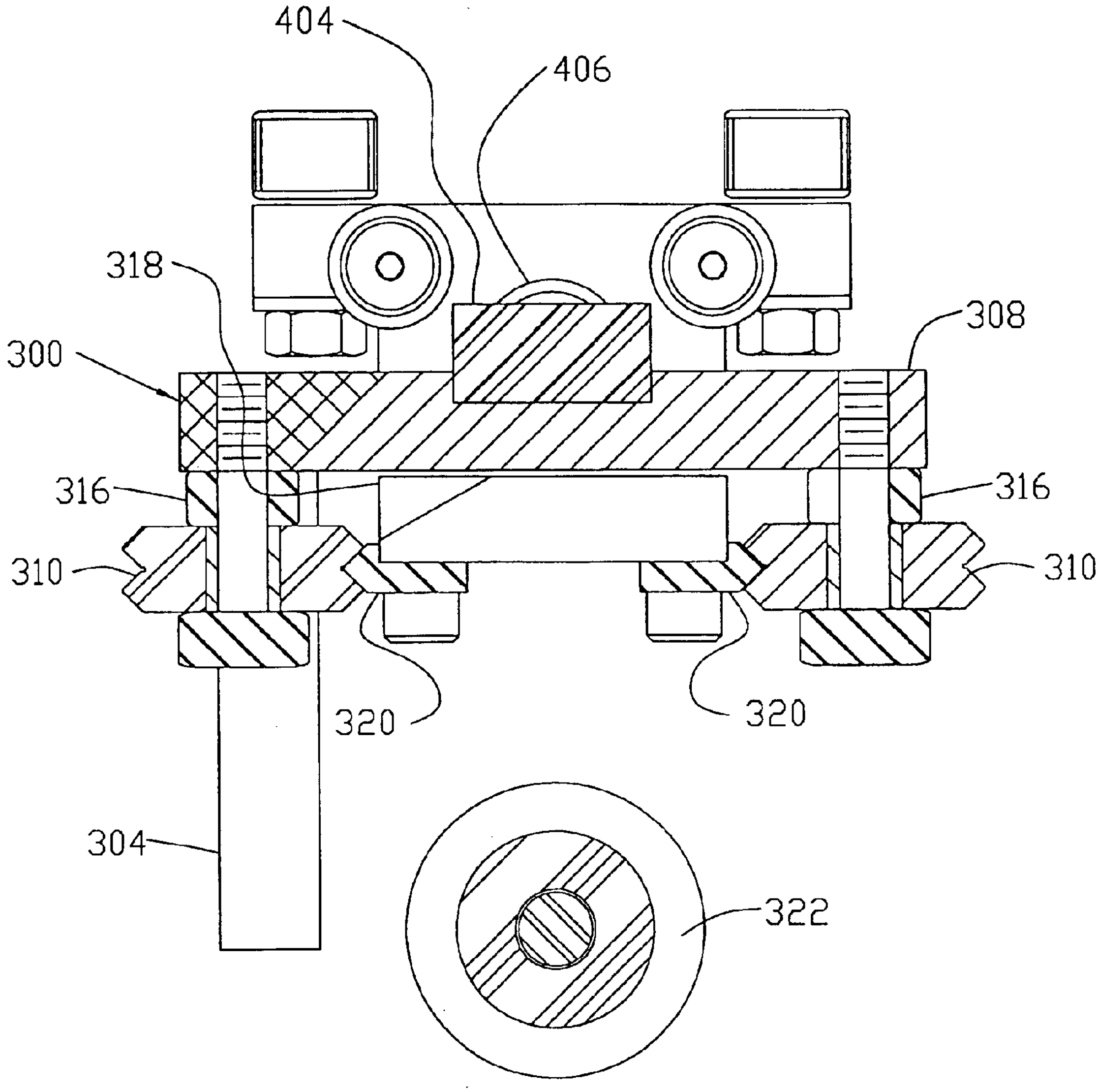
FIG. 35 is a sectional view taken along lines XXXV—XXXV of FIG. 34.
Figure 42:
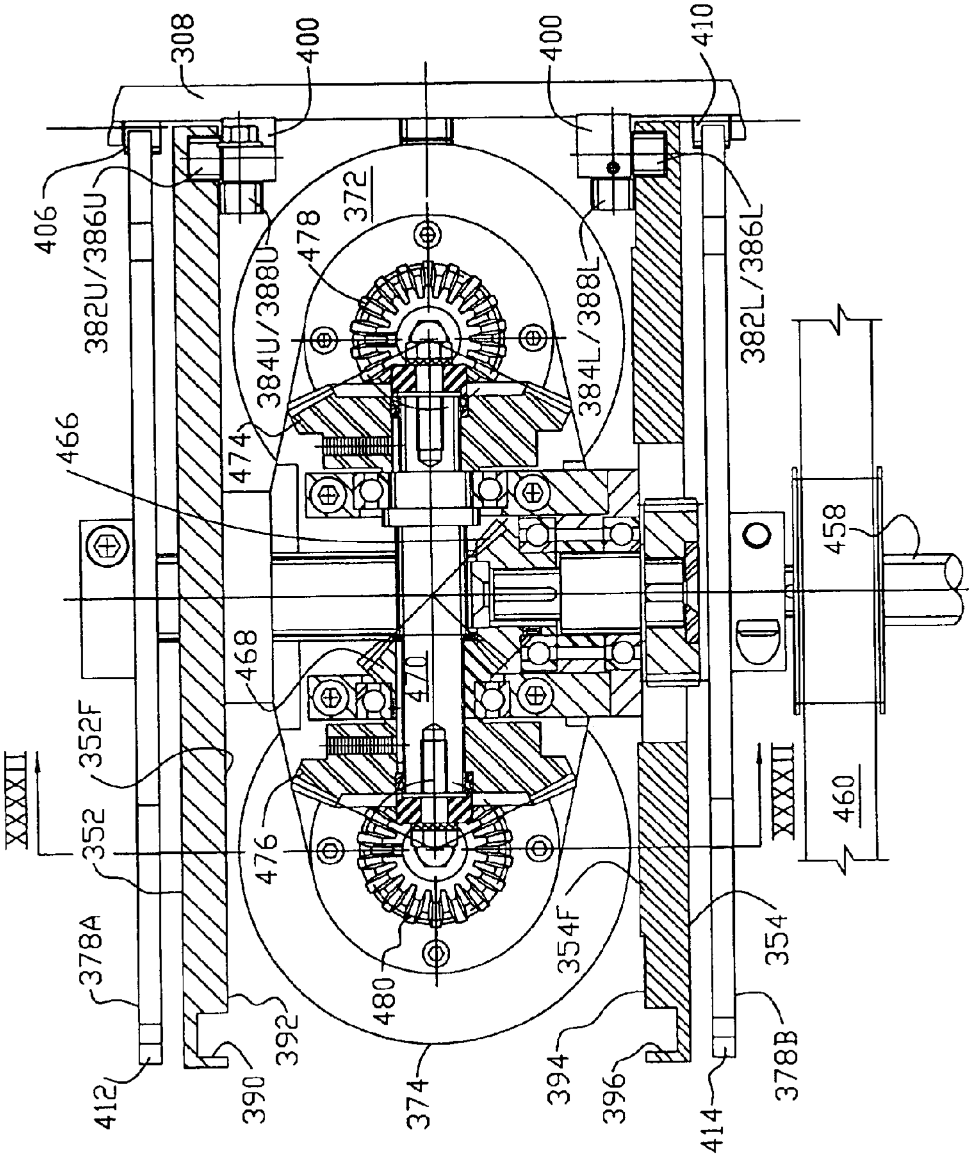
FIG. 42 is an enlarged sectional view taken along lines XXXXII—XXXXII of FIG. 38.

The vertical bottle steady carriers 300 are driven about the oval shaped cam 332 by the combination of parallel and spaced barrel cams 372 and 374 extending horizontally along opposite sides of the three spacers columns 360. At the ends of the cams 372 and 374, the vertical bottle steady carriers 300 are transferred by a pair of carrier return disks 376A and 376B from barrel cam 372 to barrel cam 374. A pair of carrier supply disks 378A and 378B transfers the vertical bottle steady carriers from barrel cam 374 to barrel cam 372. The barrel cams 372 and 374 have closed cam tracks 372A and 374A, respectively that receive the roller parts of a cam follower 380 mounted on each of the vertical arranged based plates 308 of the bottle steady carriers. As shown in FIGS. 36 and 37, each of the vertically arranged base plates 308 is provided with two pairs of spaced apart guide rollers 382L, 384L, and 386L, 388L at the lower portion the base plate 308 and two pairs of spaced apart guide rollers 382U, 384U, and 386U, 388U at the upper portion the base plate 308. As best shown in FIG. 42, the downwardly facing surface 352F of the oval shaped upper housing plate 352 is provided with an endless vertical guide track 390 spaced inwardly from an endless horizontal guide surface 392. The cavity of the endless vertical guide track 390 receives the guide rollers 382U and 386U which have vertically arranged rotational axes and the endless horizontal guide surface 392 is engaged by rolling contact the guide rollers 384U and 388U which have horizontally arranged rotational axes. The upwardly facing surface 354F of the lower oval shaped housing plate 354 is provided with an endless vertical guide track 394 spaced inwardly from an endless horizontal guide surface 396. The cavity of the endless vertical guide track 396 receives the guide rollers 384L and 388L, which have vertically arranged rotational axes, and the endless horizontal guide surface 394 is engaged by rolling contact the guide rollers 382L and 386L, which have horizontally arranged rotational axes. The guidance provided by the cooperation between the guide rollers 382L, 386L and 382U, 386U which rotate about vertical axes and the vertical guide tracks 390 and 394 provide load-bearing support for the vertical bottle steady carrier 300; maintain cam follower 380 engaged with the cam tracks of the barrel cams 372 and 374 and maintain the vertical carrier in a stable orientation during movement along the cam tracks. The guidance provided by the cooperation between the guide rollers 382L, 386L and 384U, 388U which rotate about horizontal axes and the horizontal guide surfaces 392 and 394 maintain the vertical carrier in a stable orientation during movement along the cam track and prevent unwanted displacement of the vertical carrier between the horizontal guide surfaces 392 and 394 in a longitudinal axis of a bottle when supported by the vertical carrier.

FIGS. 36, 37 and 42 illustrate the mounting block 400 secured to the back surface of the vertically arranged base plate 308 supporting the upper guide rollers 382U, 284U, 286U, and 388U and similarly, mounting block 402 secured to the back surface of base plate 308 supports the lower guide rollers 382L, 384L, 386L, and 388L. Upwardly of the mounting block 400 is a mounting block 404 rotatably supporting a follower roller 406 and downward of mounting block 402 is a mounting block 408 rotatably supporting follower roller 410. The follower rollers 406 and 410 are orientated to rotate about a vertical axis and pass into engagement with vertically aligned cavities 412 and 414 distributed about the outer peripheral edges of the pairs of carrier return disks 378A and 378B when cam follower 380 exits cam track 372A of the barrel cam 372. Similarly, the follower rollers 406 and 410 pass into engagement with vertically aligned cavities 416 and 418 distributed about the outer peripheral edges of carrier supply disks 376A and 376B when cam followers exit cam track 374A of the barrel cam 374.

Figure 41:
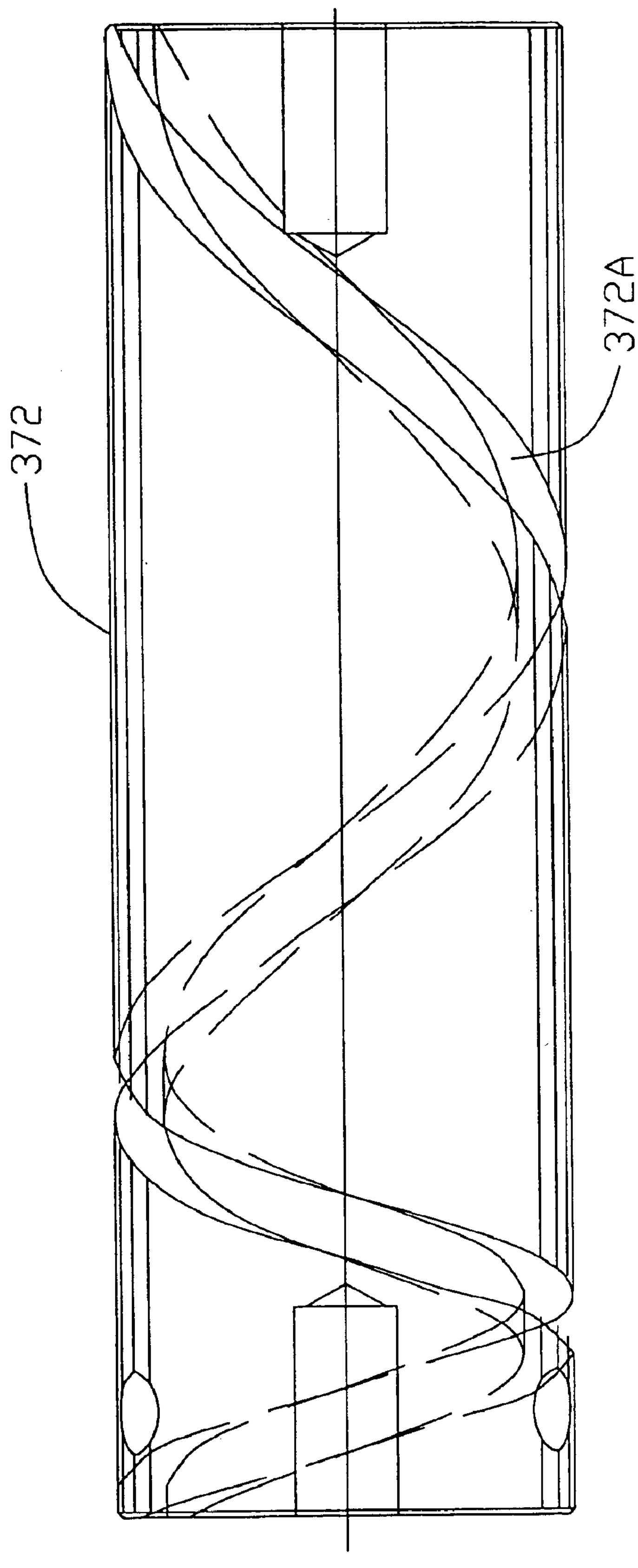
FIG. 41 is an illustration of the profile of the cam track for speed control cam for part of the bottle steady apparatus of the present invention.

The vertical bottle carriers are each sequentially transferred from an established positive driving relation with barrel cam 372 into a positive driving relation with return disks 376A and 376B and transferred by return disks into a positive driving relation with barrel cam 374 and thence from barrel cam 374 to a positive driving relation with supply disks 378A and 378B completing a conveyance cycle. The cams to disks transfers are always the same to maintain a continuous supply of vertical bottle carriers 300 for supporting and decelerating a bottle during initial travel of the bottle along the delivery conveyor 24B, i.e. negative acceleration, the deceleration to the linear speed is accomplished by the configuration of the closed cam track surface 372A shown in detail in FIG. 41 the cam track follows a course of continuous deceleration which also functions to reduce the spacing between adjacent bottle carriers.

Figure 38:
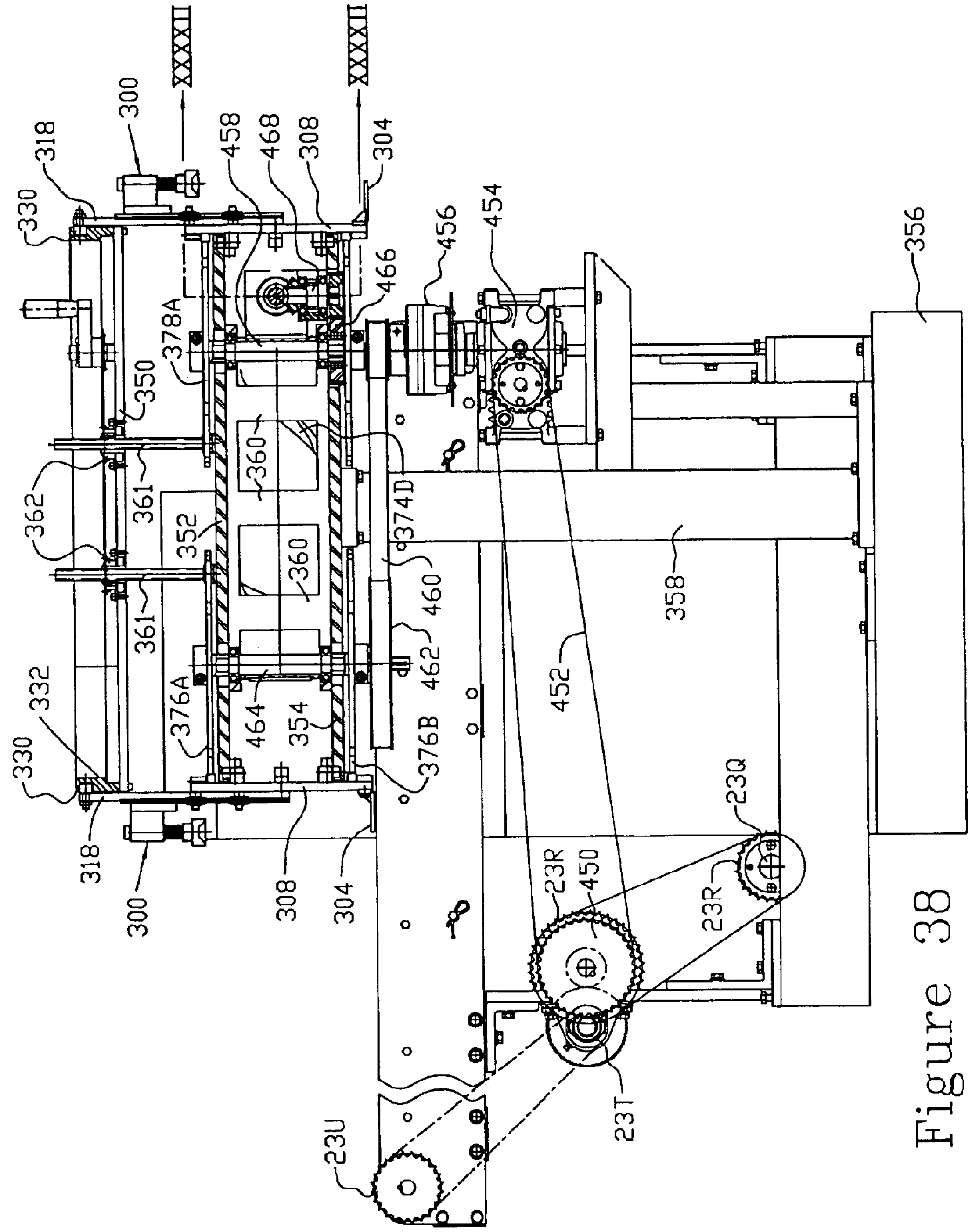
FIG. 38 is a sectional view taken along lines XXXVIII—XXXVIII of FIG. 33.
Figure 39:
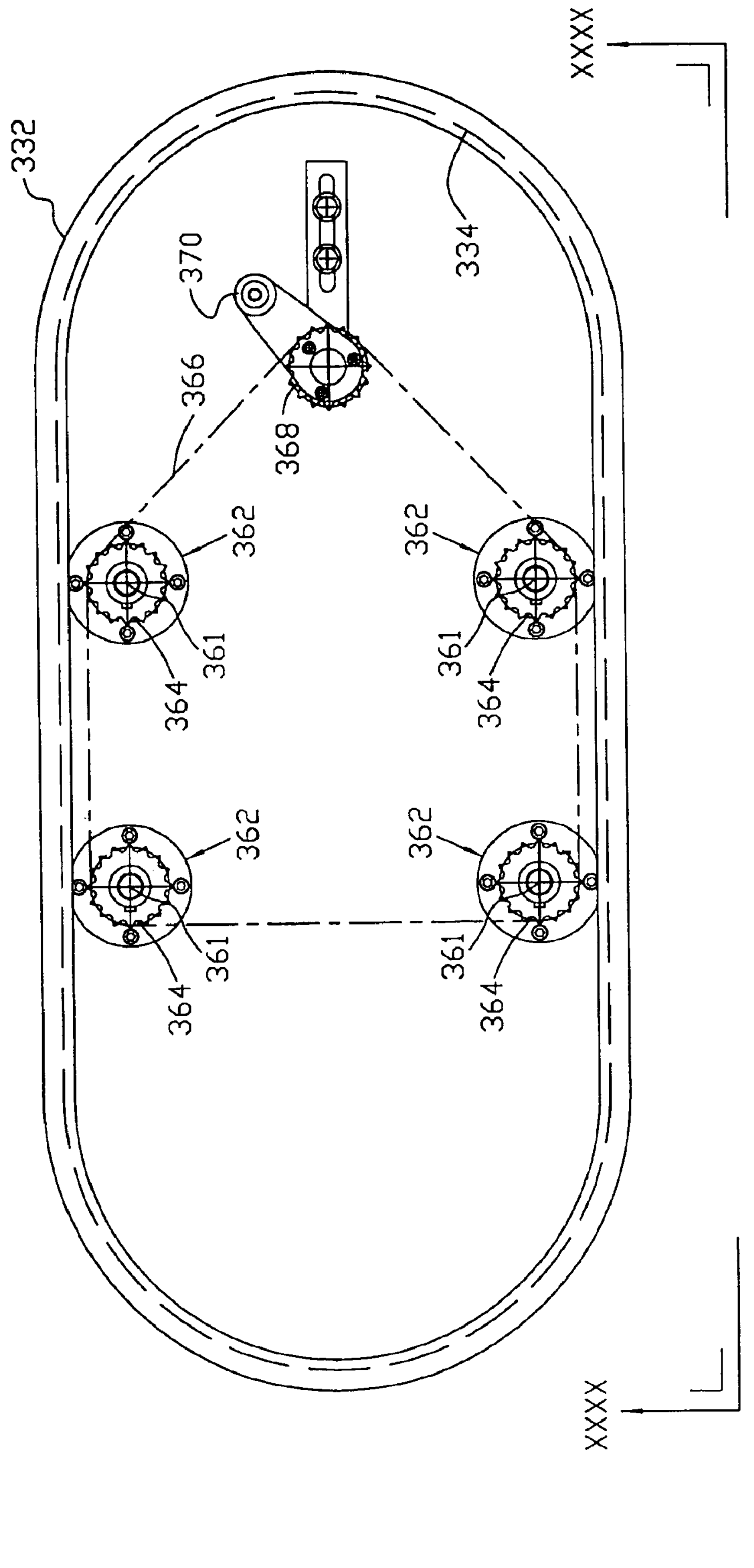
FIG. 39 is a plan view taken along lines XXXXIX—XXXIX of FIG. 33.
Figure 43:
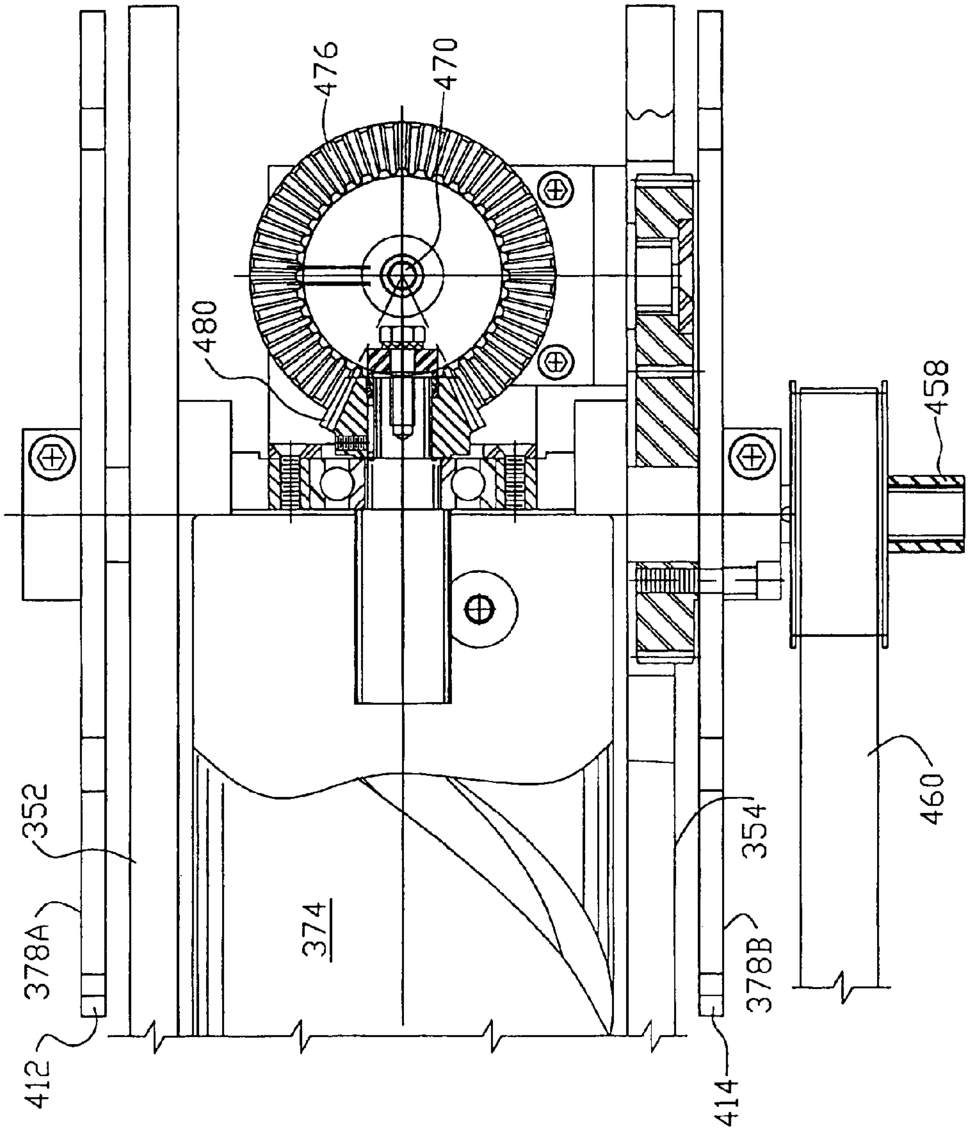
FIG. 43 is a sectional view taken along lines XXXXIII—XXXXIII of FIG. 42.

As shown in FIG. 1 the distances between consecutive vertical bottle carriers 300 progressively decreases as the carries move along the length of the barrel cam 372 and thereby decrease the speed of the bottle to such an extent that the forward speed of the bottle match the linear speed the conveyor. The carrier return discs rotate at different constant speeds which match the delivery and exit speeds of the carriers at the ends of the barrel cams. The barrel cam 374 accelerates the speed of the carriers thus increasing the distance between the carriers so that the carrier speed when driven by the carrier supply discs 376 imparts a traveling motion corresponding to the velocity of the bottle at the handoff location between the unloading bottle transfer and the vertical bottle carrier at the entrance to the cam track of the barrel cam 374 where upon the cycle is completed. As shown in FIG. 38 the drive sprocket 23R drives a sprocket 450 that is joined by the chain 452 to a sprocket on an input shaft of a cone worm drive 454. The drive 454 is connected through an overload clutch 456 to a drive shaft 458 that is mounted to rotate the supply discs 378A and 378B. A pulley mounted on shaft 358 is joined by a drive belt 460 to a pulley 462 mounted on a drive shaft 464 to rotate the return discs 376A and 376B. Details of a bevel gear drive for the barrel cams and disks are shown in FIGS. 42 and 43. Shaft 457 drives a spur gear 465 that meshes with a spur gear 466 mounted on a vertical drive shaft 467. A bevel drive gear 468 is mounted on shaft 467 and meshes with a bevel drive gear 468 mounted on a line shaft 470. The line shaft 470 drives spaced apart bevel gears 474 and 476, which in turn mesh with bevel gears 478 and 480, respectively, mounted on a drive shaft joined with the barrel cams 372 and 374, respectively.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. An apparatus to establish a predetermined orientation of a surface of a workpiece at a registration station in an intermittent decorating machine including a plurality of horizontally spaced apart decorating stations preceded by said registration station; said apparatus including a workpiece carrier having chucks to independently rotatably support each workpiece while residing at each of said stations; and, a workpiece feed cam for advancing said workpiece carrier along said stations, said workpiece feed cam including a continuous motion cam track with a dwell period at each of said stations for presenting a workpiece on said workpiece carrier to register the orientation of the workpiece at said registration station and apply decoration to the workpiece at each of said horizontally spaced apart decorating stations.

2. The apparatus according to claim 1 further including an operating system for reducing the clamping pressure applied to the workpieces by said chucks at said registration station during workpiece orientation.

3. The apparatus according to claim 2 further including drives for rotating a workpiece supported by said chucks on said workpiece carrier; and, a registration member responsive to a predetermined site on said workpiece for stopping rotation of a workpiece by one of said drives at said registration station to establish the predetermined orientation of a surface of the workpiece to receive decoration at said decorating stations.

4. The apparatus according to claim 3 further including a resilient member for applying a clamping pressure against a workpiece supported by said chucks, said operating system including an actuator for reducing said clamping pressure at said registration station.

5. A method to establish a predetermined orientation of a surface of a workpiece to receive decoration relative to decorating stations of an intermittent decorating machine, said method including the steps of providing an intermittent decorating machine having a plurality of horizontally spaced apart decorating stations preceded by a registration station; rotatably supporting each of a plurality of workpieces to independently rotate about elongated central axis of the workpieces while residing at each of said stations; and, using a workpiece feed cam for advancing said workpieces along said stations, said workpiece feed cam including a continuous motion cam track with a dwell period at each of said stations for presenting a workpiece to register the orientation of the workpiece at said registration station and apply decoration to the workpieces at each of said horizontally spaced apart decorating stations.

6. The method according to claim 5 wherein the orientation of the workpiece at said registration station establishes a predetermined orientation of each workpiece with respect to each decorating station, said method including the further step of controlling rotation of each workpiece advancing to and from said decorating stations to retain use of said predetermined orientation at each of said decorating stations.

7. The method according to claim 5 including the further steps of:

decorating workpieces at each of said decorating stations; and varying the conveyance speed of workpieces along a moving conveyor to change the speed of travel between entry and discharge speeds one of which corresponds to and the other differs from the conveyance speed by said moving conveyor.

8. The method according to claim 7 including the further step of:

engaging the workpieces while having elongated central axes extending vertically at vertically spaced sites to stabilize the movement of the workpiece along said moving conveyor.

9. The method according to claim 8 wherein said step of varying the conveyance speed of workpieces includes depositing a succession of workpieces at spaced apart intervals of time; and wherein space between the consecutively advancing workpieces along said moving conveyor ever changing by the change to the speed of travel by the consecutively advancing workpieces.

10. The method according to claim 9 wherein said moving conveyor moves at a constant speed.

* * * * *